US012648027B2

(12) United States Patent
Li et al.

(10) Patent No.: US 12,648,027 B2
(45) Date of Patent: Jun. 2, 2026

(54) DATA TRANSMISSION METHOD AND APPARATUS

(71) Applicant: HUAWEI TECHNOLOGIES CO., LTD., Guangdong (CN)

(72) Inventors: Yunbo Li, Shenzhen (CN); Wei Ruan, Shanghai (CN); Ming Gan, Shenzhen (CN); Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 445 days.

(21) Appl. No.: 18/302,051

(22) Filed: Apr. 18, 2023

(65) Prior Publication Data

US 2023/0262785 A1      Aug. 17, 2023

Related U.S. Application Data

(63) Continuation of application No. PCT/CN2021/111010, filed on Aug. 5, 2021.

(30) Foreign Application Priority Data

Oct. 19, 2020      (CN) ......................... 202011120199.3

(51) Int. Cl.
    *H04W 74/0833*      (2024.01)
    *H04W 74/08*      (2009.01)

(52) U.S. Cl.
    CPC ..... *H04W 74/085* (2013.01); *H04W 74/0866* (2013.01)

(58) Field of Classification Search
    CPC ........... H04W 74/085; H04W 74/0866; H04W 84/12; H04W 36/06; H04W 74/0816; H04W 28/18
    See application file for complete search history.

(56) References Cited

U.S. PATENT DOCUMENTS

| | | | | |
|---|---|---|---|---|
| 10,231,251 | B2 * | 3/2019 | Wang .................... | H04W 72/04 |
| 2017/0171773 | A1 * | 6/2017 | Cariou ............. | H04W 74/0841 |
| 2017/0202019 | A1 * | 7/2017 | You ................... | H04W 74/0808 |
| 2017/0311289 | A1 * | 10/2017 | Kim ................. | H04W 74/0816 |
| 2018/0317170 | A1 * | 11/2018 | Cariou ................. | H04W 52/44 |

(Continued)

FOREIGN PATENT DOCUMENTS

| | | |
|---|---|---|
| CN | 105682247 A | 6/2016 |
| CN | 106559900 A | 4/2017 |

OTHER PUBLICATIONS

802.Nov-2016, Part 11: Wireless LAN Medium Access Control (MAC) and Physical Layer (PHY) Specifications, Dec. 7, 2016, total 3534 pages.

(Continued)

*Primary Examiner* — Kan Yuen

(57) ABSTRACT

The technology of this application relates to a first device configured to perform backoff on a primary 20 MHz channel, to perform data transmission with a second device. When a first preset condition is met, the first device switches from the primary 20 MHz channel to a first channel, where the first channel is a channel preconfigured for communication between the first device and the second device, the first channel does not include the primary 20 MHz channel, and the first preset condition at least includes that the primary 20 MHz channel is in a busy state.

17 Claims, 14 Drawing Sheets

A first device performs backoff on a primary 20 MHz channel, to perform data transmission with a second device ⟋ S101

When a first preset condition is met, the first device switches from the primary 20 MHz channel to a first channel ⟋ S102

(56)                    References Cited

U.S. PATENT DOCUMENTS

| 2021/0076412 | A1 * | 3/2021 | Naribole | ............... | H04W 76/15 |
| 2021/0084711 | A1 * | 3/2021 | Park | .................. | H04W 72/0453 |
| 2021/0212118 | A1 * | 7/2021 | Lu | .................... | H04W 74/0816 |

OTHER PUBLICATIONS

IEEE Std 802.11a-1999, Part 11: Wireless LAN Medium Access
Control (MAC) and Physical Layer (PHY) specifications: High-
speed Physical Layer in the 5 GHZ Band, Sep. 16, 1999, total 90
pages.
PCT International Search Report for Application No. PCT/CN2021/
111010 dated Aug. 5, 2021, 9 pages.

* cited by examiner

TXOP: Transmission opportunity        PPDU: Physical protocol data unit
STA: Station                          PIFS: Point coordination function interframe space
PIFS idle: PIFS idle                  PIFS busy: PIFS busy
OBSS: Overlapped basic service set    BA: Block acknowledgment Internet
(Internet)

AP

STA 1

STA 2

STA 3

A first device performs backoff on a primary 20 MHz channel, to perform data transmission with a second device    S101

When a first preset condition is met, the first device switches from the primary 20 MHz channel to a first channel    S102

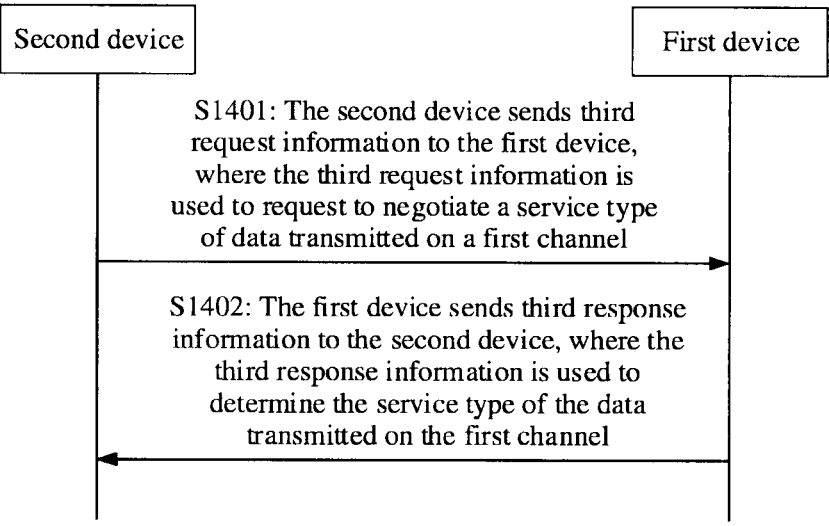

S1401: The second device sends third request information to the first device, where the third request information is used to request to negotiate a service type of data transmitted on a first channel S1402: The first device sends third response information to the second device, where the third response information is used to determine the service type of the data transmitted on the first channel

FIG. 13(b)

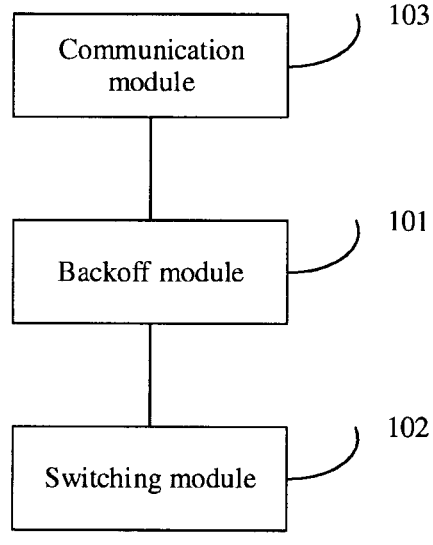

Communication module 103

Backoff module 101

Switching module 102

FIG. 14

DATA TRANSMISSION METHOD AND APPARATUS

CROSS-REFERENCE TO RELATED APPLICATIONS

This application is a continuation of International Application No. PCT/CN2021/111010, filed on Aug. 5, 2021, which claims priority to Chinese Patent Application No. 202011120199.3, filed on Oct. 19, 2020. The disclosures of the aforementioned applications are herein incorporated by reference in their entireties.

TECHNICAL FIELD

This application relates to the field of wireless communication technologies, and in particular, to a data transmission method and apparatus.

BACKGROUND

The Institute of Electrical and Electronics Engineers (IEEE) 802.11 is one of mainstream wireless access standards and is widely used. In the IEEE 802.11a standard, only a bandwidth of 20 MHz is supported, but a supported bandwidth increases continuously in a subsequent standard evolution process. For example, in the 802.11n standard, a maximum bandwidth of 40 MHz is supported; and in the 802.11ac/ax standard, a maximum bandwidth of 160 (80+80) MHz is supported. To ensure backwards compatibility during standard evolution, there is a unique primary 20 MHz channel regardless of a bandwidth. The primary 20 MHz channel needs to be included when a device uses any bandwidth to send data. This results in a problem that when the unique primary 20 MHz channel is busy, all other idle secondary channels (or referred to as subordinate channels) cannot be used, and this reduces system efficiency.

Currently, in a latest Wi-Fi standard (namely, the 802.11be standard), a maximum bandwidth of 320 MHz is supported. In the 802.11be standard, to make full use of a channel, when an access point (AP) supports a large bandwidth (for example, 320 MHz), some stations (STAs) that support only a small bandwidth (for example, only 80 MHz) are allowed to be scheduled to perform data transmission on a secondary channel, to avoid a case in which all STAs that support the small bandwidth are clustered on a primary channel, and few STAs or no STA can perform data transmission on the secondary channel. A typical method for transmitting data on the secondary channel is as follows: Each STA supporting only 80 MHz is scheduled to park on a secondary 80 MHz channel of a 320 MHz channel; when the STA parks on any secondary 80 MHz channel other than a primary 80 MHz channel, uplink data of the STA can be scheduled only by the AP by using a trigger frame, and the STA cannot actively perform channel contention and send the uplink data. Otherwise, sending end moments of data on a plurality of secondary 80 MHz channels may be different, and as a result, the AP cannot perform correct parsing.

Although the foregoing solution enables the AP to obtain an additional transmission opportunity on a non-primary channel, a data transmission delay between the AP and a same STA cannot be reduced, or a data transmission throughput between the AP and the same STA cannot be increased.

SUMMARY

This application provides a data transmission method and apparatus, to reduce a data transmission delay between two devices and increase a data transmission throughput between the two devices.

According to a first aspect, a data transmission method is provided, including: A first device performs backoff on a primary 20 MHz channel, to perform data transmission with a second device; and when a first preset condition is met, the first device switches from the primary 20 MHz channel to a first channel, where the first channel is a channel preconfigured for communication between the first device and the second device, the first channel does not include the primary 20 MHz channel, and the first preset condition at least includes that the primary 20 MHz channel is in a busy state.

Based on the foregoing technical solution, because the first preset condition at least includes that the primary 20 MHz channel is in the busy state, when the preset condition is met, data transmission cannot be performed between the first device and the second device by using the primary 20 MHz channel. However, when the first preset condition is met, the first device switches from the primary 20 MHz channel to the first channel, and before the primary 20 MHz channel switches from the busy state to an idle state, there is a probability that the first device can obtain an additional transmission opportunity, to perform data transmission with the second device. Compared with the conventional technology in which data can be transmitted between the first device and the second device only after the primary 20 MHz channel is switched from the busy state to the idle state, in this embodiment of this application, there is a probability that the first device and the second device can perform data transmission when the primary 20 MHz channel is in the busy state. Therefore, there is a probability that a data transmission delay between the first device and the second device is reduced, and a data throughput between the first device and the second device can be improved.

In a possible implementation, that the primary 20 MHz channel is in a busy state includes at least one of the following cases: The first device receives a first overlapped basic service set (overlapped BSS, OBSS) frame on the primary 20 MHz channel; or the first device determines that an energy detection result on the primary 20 MHz channel is a busy state; or the first device determines that a value of a first network allocation vector (NAV) on the primary 20 MHz channel is greater than 0.

In a possible implementation, the first preset condition further includes that target duration is greater than or equal to first preset duration; and the target duration is remaining transmission duration of the first OBSS frame received by the first device on the primary 20 MHz channel, or the target duration is remaining timing duration of the first NAV on the primary 20 MHz channel. In this way, a probability that the first device performs an unnecessary channel switching operation is reduced.

In a possible implementation, the method further includes: The first device performs backoff on the first channel; and after the first channel backs off to 0, the first device performs data transmission with the second device on the first channel.

In a possible implementation, when the first channel includes a plurality of subchannels, that the first device performs backoff on the first channel includes: The first device performs backoff on each of the plurality of subchannels. In this way, a channel can be obtained through channel contention as soon as possible, to reduce a data transmission delay.

In a possible implementation, the method further includes: If the first device synchronizes to a physical frame header on any subchannel of the first channel, the first device suspends backoff on all subchannels of the first channel, and determines whether a physical frame corresponding to the physical frame header is an OBSS frame; and if the physical frame corresponding to the physical frame header is an OBSS frame, the first device continues to perform backoff on each subchannel of the first channel; or if the physical frame corresponding to the physical frame header is not an OBSS frame, the first device continues to suspend backoff on all subchannels of the first channel until transmission of the physical frame corresponding to the physical frame header is completed; or if the physical frame corresponding to the physical frame header is not an OBSS frame, the first device continues to suspend backoff on all subchannels of the first channel until an NAV configured for the physical frame corresponding to the physical frame header is reduced to 0. In this way, a transmit/receive conflict problem of the first device is avoided.

In a possible implementation, the method further includes: The first device receives a physical frame on any subchannel of the first channel; and if the first device determines that the physical frame is from a BSS to which the first device belongs, the first device suspends backoff on all subchannels of the first channel until transmission of the physical frame is completed; or if the first device determines that the physical frame is from a BSS to which the first device belongs, the first device suspends backoff on all subchannels of the first channel until an NAV configured for the physical frame is reduced to 0. In this way, a probability that a transmit/receive conflict occurs on the first device is reduced.

In a possible implementation, when the first channel includes a plurality of subchannels, that the first device performs backoff on the first channel includes: The first device performs backoff on one of the plurality of subchannels; and when the subchannel is in a busy state, the first device switches, based on a preset sequence, to another subchannel in the plurality of subchannels to perform backoff. In this way, flexibility of performing backoff by the first device is improved, and a case in which the first device cannot obtain a channel through contention because one subchannel is in a busy state for a long time is avoided.

In a possible implementation, that the subchannel is in a busy state includes at least one of the following cases: The first device receives a second OBSS frame on the subchannel; or the first device detects no radio frame, but duration in which the first device determines that an energy detection result on the subchannel is a busy state is greater than or equal to second preset duration; or the first device determines that a value of a second NAV on the subchannel is greater than 0.

In a possible implementation, the method further includes: The first device performs energy detection on the subchannel; and when an energy detection value on the subchannel is greater than or equal to an energy detection threshold, the first device determines that the energy detection result on the subchannel is the busy state; or when an energy detection value on the subchannel is less than an energy detection threshold, the first device determines that the energy detection result on the subchannel is an idle state, where the energy detection threshold of the subchannel is set to a value less than −62 dBm and greater than −82 dBm. In this way, fairness of channel contention between the first device and another device is ensured, and a case in which normal transmission of the another device is affected because the first device preempts a channel obtained through contention by another device is avoided.

In a possible implementation, the method further includes: Before duration in which the first device switches from the primary 20 MHz channel to the first channel reaches the target duration, the first device switches from the first channel to the primary 20 MHz channel, where the target duration is the remaining transmission duration of the first OBSS frame received by the first device on the primary 20 MHz channel, or the target duration is the remaining timing duration of the first NAV on the primary 20 MHz channel. In this way, a possibility that the first device misses an update opportunity of the first NAV on the primary 20 MHz channel is reduced.

In a possible implementation, the method further includes: If the target duration is the remaining timing duration of the first NAV on the primary 20 MHz channel, the first device performs a blind recovery operation on the primary 20 MHz channel. In this way, fairness of channel contention between the first device and another device is ensured, and a case in which normal transmission of the another device is affected because the first device preempts a channel obtained through contention by another device is avoided.

In a possible implementation, the method further includes: The first device receives first indication information sent by the second device; or the first device sends first indication information to the second device, where the first indication information is used to configure the first channel. Based on this implementation, a same first channel may be determined between the first device and the second device.

In a possible implementation, the method further includes: The first device sends first request information to the second device, where the first request information is used to request to negotiate the first channel; and the first device receives first response information sent by the second device, where the first response information is used to respond to the first request information, and the first response information is used to determine the first channel. Based on this implementation, a same first channel may be determined between the first device and the second device.

In a possible implementation, the method further includes: The first device receives first request information sent by the second device, where the first request information is used to request to negotiate the first channel; and the first device sends first response information to the second device, where the first response information is used to respond to the first request information, and the first response information is used to determine the first channel. Based on this implementation, a same first channel may be determined between the first device and the second device.

In a possible implementation, the first channel is in one of the following cases: The first channel is a secondary 20 MHz channel; or the first channel is a 20 MHz channel with a lowest frequency in an 80 MHz channel; or the first channel is a 20 MHz channel with a highest frequency in an 80 MHz channel.

In a possible implementation, the method further includes: The first device receives second indication information sent by the second device; or the first device sends second indication information to the second device, where the second indication information indicates whether to enable a first transmission mechanism, and the first transmission mechanism is used by the first device and the second device to switch from the primary 20 MHz channel to the channel when the first preset condition is met. Based on this implementation, the first transmission mechanism may be flexibly enabled or disabled between the first device and the second device, so that the first transmission mechanism is applied to a proper scenario.

In a possible implementation, the method further includes: The first device sends second request information to the second device; and the first device receives second response information sent by the second device, where the second request information is used to request to enable a first transmission mechanism, the second response information is used to agree to or refuse to enable the first transmission mechanism, and the first transmission mechanism is used by the first device and the second device to switch from the primary 20 MHz channel to the channel when the first preset condition is met; or the second request information is used to request to disable a first transmission mechanism, and the second response information is used to agree to or refuse to disable the first transmission mechanism. Based on this implementation, the first transmission mechanism may be flexibly enabled or disabled between the first device and the second device, so that the first transmission mechanism is applied to a proper scenario.

In a possible implementation, the method further includes: The first device receives second request information sent by the second device; and the first device sends second response information to the second device, where the second request information is used to request to enable a first transmission mechanism, the second response information is used to agree to or refuse to enable the first transmission mechanism, and the first transmission mechanism is used by the first device and the second device to switch from the primary 20 MHz channel to the channel when the first preset condition is met; or the second request information is used to request to disable a first transmission mechanism, and the second response information is used to agree to or refuse to disable the first transmission mechanism. Based on this implementation, the first transmission mechanism may be flexibly enabled or disabled between the first device and the second device, so that the first transmission mechanism is applied to a proper scenario.

In a possible implementation, the method further includes: The first device receives third indication information sent by the second device; or the first device sends third indication information to the second device, where the third indication information indicates a service type of data transmitted on the first channel. Based on this implementation, a service type of data transmitted on the first channel may be determined between the first device and the second device, to help reduce a transmission delay of data of the service type.

In a possible implementation, the method further includes: The first device sends third request information to the second device, where the third request information is used to request to negotiate a service type of data transmitted on the first channel; and the first device receives third response information sent by the second device, where the third response information is used to respond to the third request information, and the third response information is used to determine the service type of the data transmitted on the first channel. Based on this implementation, a service type of data transmitted on the first channel may be determined between the first device and the second device, to help reduce a transmission delay of data of the service type.

In a possible implementation, the method further includes: The first device receives third request information sent by the second device, where the third request information is used to request to negotiate a service type of data transmitted on the first channel; and the first device sends third response information to the second device, where the third response information is used to respond to the third request information, and the third response information is used to determine the service type of the data transmitted on the first channel. Based on this implementation, a service type of data transmitted on the first channel may be determined between the first device and the second device, to help reduce a transmission delay of data of the service type.

According to a second aspect, a communication apparatus is provided, including a backoff module and a switching module. The backoff module is configured to perform backoff on a primary 20 MHz channel, to perform data transmission with a second device. The switching module is configured to: when a first preset condition is met, switch from the primary 20 MHz channel to a first channel, where the first channel is a channel preconfigured for communication between the communication apparatus and the second device, the first channel does not include the primary 20 MHz channel, and the first preset condition at least includes that the primary 20 MHz channel is in a busy state.

In a possible implementation, that the primary 20 MHz channel is in a busy state includes at least one of the following cases: A first device receives a first OBSS frame on the primary 20 MHz channel; or a first device determines that an energy detection result on the primary 20 MHz channel is a busy state; or a first device determines that a value of a first NAV on the primary 20 MHz channel is greater than 0.

In a possible implementation, the first preset condition further includes that target duration is greater than or equal to first preset duration; and the target duration is remaining transmission duration of the first OBSS frame received by the first device on the primary 20 MHz channel, or the target duration is remaining timing duration of the first NAV on the primary 20 MHz channel.

In a possible implementation, the communication apparatus further includes a communication module. The backoff module is further configured to perform backoff on the first channel. The communication module is configured to perform data transmission with the second device on the first channel after the first channel backs off to 0.

In a possible implementation, the backoff module is specifically configured to: when the first channel includes a plurality of subchannels, perform backoff on each of the plurality of subchannels.

In a possible implementation, the backoff module is further configured to: if the backoff module synchronizes to a physical frame header on any subchannel of the first channel, suspend backoff on all subchannels of the first channel, and determine whether a physical frame corresponding to the physical frame header is an OBSS frame; and if the physical frame corresponding to the physical frame header is an OBSS frame, continue to perform backoff on each subchannel of the first channel; or if the physical frame corresponding to the physical frame header is not an OBSS frame, continue to suspend backoff on all subchannels of the first channel until transmission of the physical frame corresponding to the physical frame header is completed; or if the physical frame corresponding to the physical frame header is not an OBSS frame, continue to suspend backoff on all subchannels of the first channel until an NAV configured for the physical frame corresponding to the physical frame header is reduced to 0.

In a possible implementation, the backoff module is further configured to: when the backoff module receives a physical frame on any subchannel of the first channel, if the backoff module determines that the physical frame is from a BSS to which the first device belongs, suspend backoff on all subchannels of the first channel until transmission of the physical frame is completed; or if the backoff module determines that the physical frame is from a BSS to which the first device belongs, suspend backoff on all subchannels of the first channel until an NAV configured for the physical frame is reduced to 0.

In a possible implementation, the backoff module is further configured to: when the first channel includes a plurality of subchannels, perform backoff on one of the plurality of subchannels; and when the subchannel is in a busy state, switch, based on a preset sequence, to another subchannel in the plurality of subchannels to perform backoff.

In a possible implementation, that the subchannel is in a busy state includes at least one of the following cases: The first device receives a second OBSS frame on the subchannel; or the first device detects no radio frame, but duration in which the first device determines that an energy detection result on the subchannel is a busy state is greater than or equal to second preset duration; or the first device determines that a value of a second NAV on the subchannel is greater than 0.

In a possible implementation, the backoff module is further configured to: perform energy detection on the subchannel; and when an energy detection value on the subchannel is greater than or equal to an energy detection threshold, determine that the energy detection result on the subchannel is the busy state; or when an energy detection value on the subchannel is less than an energy detection threshold, determine that the energy detection result on the subchannel is an idle state. The energy detection threshold of the subchannel is set to a value less than −62 dBm and greater than −82 dBm.

In a possible implementation, the switching module is further configured to: before duration in which the first device switches from the primary 20 MHz channel to the first channel reaches the target duration, switch from the first channel to the primary 20 MHz channel. The target duration is the remaining transmission duration of the first OBSS frame received by the first device on the primary 20 MHz channel, or the target duration is the remaining timing duration of the first NAV on the primary 20 MHz channel.

In a possible implementation, the backoff module is further configured to: if the target duration is the remaining timing duration of the first NAV on the primary 20 MHz channel, perform a blind recovery operation on the primary 20 MHz channel.

In a possible implementation, the communication apparatus further includes a communication module. The communication module is configured to: receive first indication information sent by the second device, or send first indication information to the second device. The first indication information is used to configure the first channel.

In a possible implementation, the communication apparatus further includes a communication module. The communication module is configured to: send first request information to the second device, where the first request information is used to request to negotiate the first channel; and receive first response information sent by the second device, where the first response information is used to respond to the first request information, and the first response information is used to determine the first channel.

In a possible implementation, the communication apparatus further includes a communication module. The communication module is configured to: receive first request information sent by the second device, where the first request information is used to request to negotiate the first channel; and send first response information to the second device, where the first response information is used to respond to the first request information, and the first response information is used to determine the first channel.

In a possible implementation, the first channel is in one of the following cases: The first channel is a secondary 20 MHz channel; or the first channel is a 20 MHz channel with a lowest frequency in an 80 MHz channel; or the first channel is a 20 MHz channel with a highest frequency in an 80 MHz channel.

In a possible implementation, the communication apparatus further includes a communication module. The communication module is configured to: receive second indication information sent by the second device; or send second indication information to the second device. The second indication information indicates whether to enable a first transmission mechanism, and the first transmission mechanism is used by the communication apparatus and the second device to switch from the primary 20 MHz channel to the channel when the first preset condition is met.

In a possible implementation, the communication apparatus further includes a communication module. The communication module is configured to: send second request information to the second device; and receive second response information sent by the second device. The second request information is used to request to enable a first transmission mechanism, the second response information is used to agree to or refuse to enable the first transmission mechanism, and the first transmission mechanism is used by the communication apparatus and the second device to switch from the primary 20 MHz channel to the channel when the first preset condition is met; or the second request information is used to request to disable a first transmission mechanism, and the second response information is used to agree to or refuse to disable the first transmission mechanism.

In a possible implementation, the communication apparatus further includes a communication module. The communication module is configured to: receive second request information sent by the second device; and send second response information to the second device. The second request information is used to request to enable a first transmission mechanism, the second response information is used to agree to or refuse to enable the first transmission mechanism, and the first transmission mechanism is used by the communication apparatus and the second device to switch from the primary 20 MHz channel to the channel when the first preset condition is met; or the second request information is used to request to disable a first transmission mechanism, and the second response information is used to agree to or refuse to disable the first transmission mechanism.

In a possible implementation, the communication apparatus further includes a communication module. The communication module is configured to: receive third indication information sent by the second device, or send third indication information to the second device. The third indication information indicates a service type of data transmitted on the first channel.

In a possible implementation, the communication apparatus further includes a communication module. The communication module is configured to: send third request information to the second device, where the third request information is used to request to negotiate a service type of data transmitted on the first channel; and receive third response information sent by the second device, where the third response information is used to respond to the third request information, and the third response information is used to determine the service type of the data transmitted on the first channel.

In a possible implementation, the communication apparatus further includes a communication module. The communication module is configured to: receive third request information sent by the second device, where the third request information is used to request to negotiate a service type of data transmitted on the first channel; and send third response information to the second device, where the third response information is used to respond to the third request information, and the third response information is used to determine the service type of the data transmitted on the first channel.

According to a third aspect, a communication apparatus is provided, where the communication apparatus includes a processor and a transceiver, and the processor and the transceiver are configured to implement the method provided according to any implementation in the first aspect. The processor is configured to perform a processing action in the corresponding method, and the transceiver is configured to perform a transmit/receive action in the corresponding method.

According to a fourth aspect, a computer-readable storage medium is provided, where the computer-readable storage medium stores computer instructions, and when the computer instructions are run on a computer, the computer is enabled to perform the method according to any implementation in the first aspect.

According to a fifth aspect, a computer program product including computer instructions is provided. When the computer instructions are run on a computer, the computer is enabled to perform the method according to any implementation in the first aspect.

According to a sixth aspect, a chip is provided, including a processing circuit and a transceiver pin, where the processing circuit and the transceiver pin are configured to implement the method according to any implementation in the first aspect. The processing circuit is configured to perform a processing action in a corresponding method, and the transceiver pin is configured to perform a transmit/receive action in the corresponding method.

It should be noted that for the technical effects brought by any implementation in the second aspect to the sixth aspect, refer to the technical effects brought by a corresponding implementation in the first aspect.

BRIEF DESCRIPTION OF DRAWINGS

FIG. 6(*b*) is an example flowchart of another data transmission method according to an embodiment of this application;

FIG. 6(*c*) is an example flowchart of another data transmission method according to an embodiment of this application;

FIG. 7(*b*) is an example flowchart of another data transmission method according to an embodiment of this application;

FIG. 7(*c*) is an example flowchart of another data transmission method according to an embodiment of this application;

FIG. 8(*b*) is an example flowchart of another data transmission method according to an embodiment of this application;

FIG. 9(*b*) is an example flowchart of another data transmission method according to an embodiment of this application;

FIG. 10(*b*) is an example flowchart of another data transmission method according to an embodiment of this application;

FIG. 11(*b*) is an example flowchart of another data transmission method according to an embodiment of this application;

FIG. 12(*b*) is an example flowchart of another data transmission method according to an embodiment of this application;

FIG. 13(*b*) is an example flowchart of another data transmission method according to an embodiment of this application;

FIG. 14 is an example schematic diagram of a structure of a communication apparatus according to an embodiment of this application.

DESCRIPTION OF EMBODIMENTS

Figure 1:
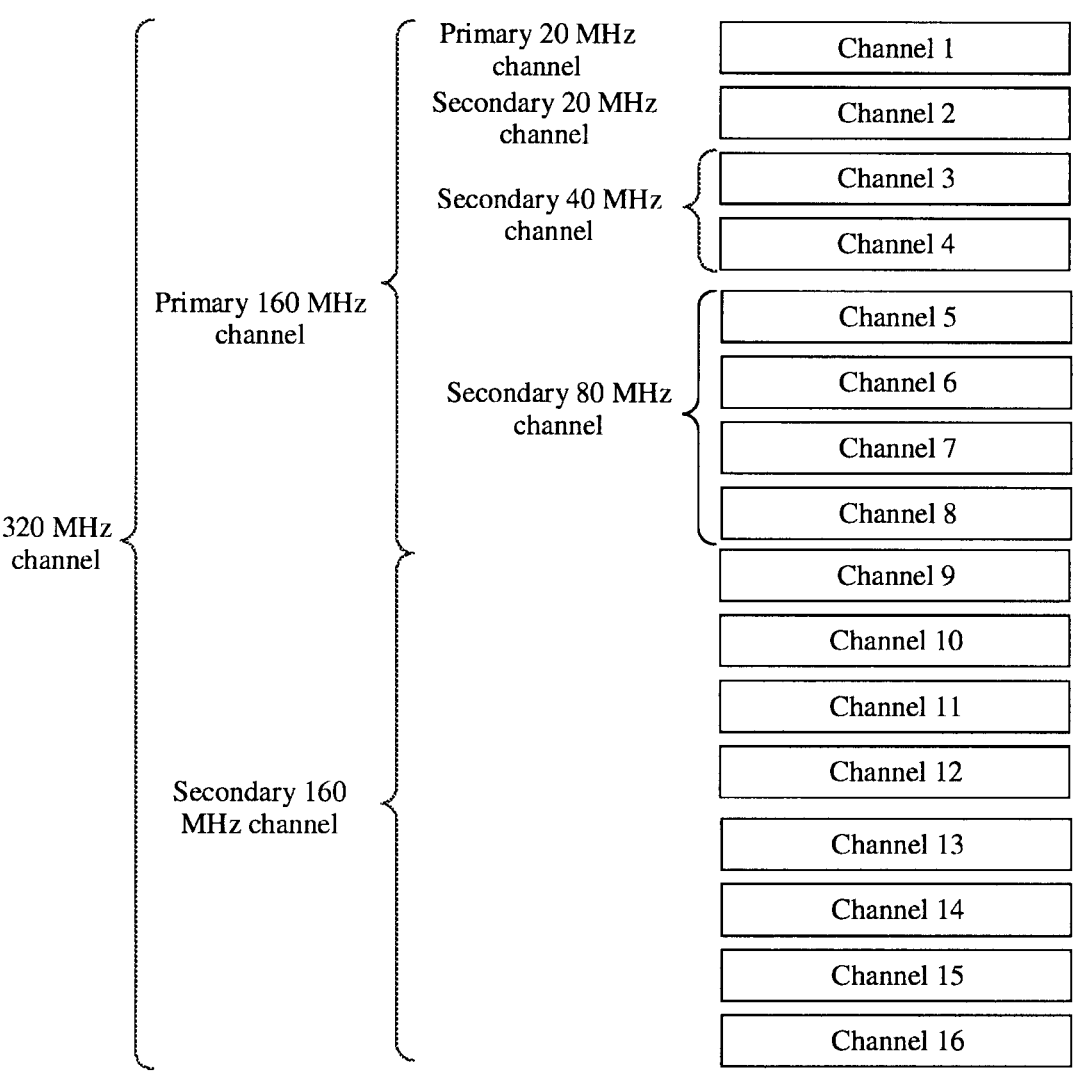
FIG. 1 is an example schematic diagram of channel division of a 320 MHz channel according to an embodiment of this application.

In descriptions of this application, unless otherwise specified, "/" means "or". For example, A/B may represent A or B. A term "and/or" in this specification describes only an association relationship between associated objects and indicates that there may be at least three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

In this application, the word such as "example" or "for example" is used to represent giving an example, an illustration, or a description. Any embodiment or implementation scheme described as an "example" or "for example" in this application should not be explained as being more preferred or having more advantages than another embodiment or implementation scheme. Exactly, use of the term such as "example" or "for example" is intended to present a related concept in a specific manner.

It may be understood that "data transmission" and "transmitting data" mentioned in this application generally refer to communication. "Data" refers to communication information in general, and is not limited to data information, and may also be signaling information or the like. "Transmission" refers to sending and receiving in general.

The following briefly describes technical terms in embodiments of this application, to help understand the technical solutions of this application.

1. BSS

A BSS is used to describe a group of devices that can communicate with each other in a wireless local area network (WLAN). The WLAN may include a plurality of BSSs. Each BSS has a unique identifier, which is referred to as a basic service set identifier (BSSID). Optionally, one BSS may include one AP and a plurality of STAs associated with the AP.

2. Transmission Opportunity (TXOP)

A TXOP is a basic unit in wireless channel access. The TXOP includes an initial time point and maximum duration (TXOP limit). In the TXOP limit, a station that obtains the TXOP may not perform channel contention again, and continuously use a channel to transmit a plurality of data frames.

The TXOP may be obtained through contention or hybrid coordinator (HC) allocation. A TXOP obtained through contention may be referred to as an enhanced distributed channel access (EDCA) TXOP. A TXOP obtained through HC allocation may be referred to as a hybrid coordination function controlled channel access (HCCA) TXOP.

It should be understood that this application does not include obtaining of the TXOP. For specific details of a manner of obtaining the TXOP, refer to the conventional technology.

3. Channel

In a WLAN, channels are usually classified into a primary channel and a secondary channel, and the secondary channel may include one or more subchannels.

In an example, if division is performed by using 20 MHz as a basic bandwidth unit, when a bandwidth of a channel is 20 MHz, the channel includes only one primary channel with a bandwidth of 20 MHz; and when a bandwidth of a channel is greater than 20 MHz, the channel includes one primary channel with a bandwidth of 20 MHz, and one or more other 20 MHz channels are secondary channels.

For example, FIG. 1 is a schematic diagram of channel division of a 320 MHz channel according to an embodiment of this application. As shown in FIG. 1, a 320 MHz frequency band may be divided into 16 20 MHz channels.

The 16 20 MHz channels may be sequentially numbered as a channel 1 to a channel 16. It should be understood that each number represents a 20 MHz channel. In FIG. 1, the channel 1 may be used as a primary 20 MHz channel (P20), and the channel 2 may be used as a secondary 20 MHz channel (S20). The channel 1 and the channel 2 may be aggregated as a primary 40 MHz channel, and the channel 3 and the channel 4 may be aggregated as a secondary 40 MHz channel. The channel 1 to the channel 4 may be aggregated as a primary 80 MHz channel, and the channel 5 to the channel 8 may be aggregated as a secondary 80 MHz channel. The channel 1 to the channel 8 may be aggregated as a primary 160 MHz channel, and the channel 9 to the channel 16 may be aggregated as a secondary 160 MHz channel.

It should be understood that the primary 20 MHz channel is a common channel of operation for stations that are members of a basic service set (a common channel of operation for stations that are members of the basic service set). Stations in the basic service set (BSS) may perform contention on the primary 20 MHz channel, to preempt channel resources.

The primary 20 MHz channel may not be the channel 1, and may alternatively be another channel. In FIG. 1, that the channel 1 is used as the primary 20 MHz channel is used as an example for description. In addition, the secondary channel may alternatively have another name, for example, a subordinate or auxiliary channel. Embodiments of this application are not limited thereto.

It should be noted that the 802.11 system supports various channel bandwidths, for example, contiguous bandwidths of 20 MHz, 40 MHz, 80 MHz, and 160 MHz, or discontinuous bandwidths of 80 MHz+80 MHz, or 320 MHz, 240 MHz+80 MHz, and 160 MHz+160 MHz. In a next generation of the 802.11 standard, the channel bandwidth may also be another bandwidth. Optionally, a channel division method thereof may be similar to that of the foregoing 320 MHz channel.

Figures 2, 3:
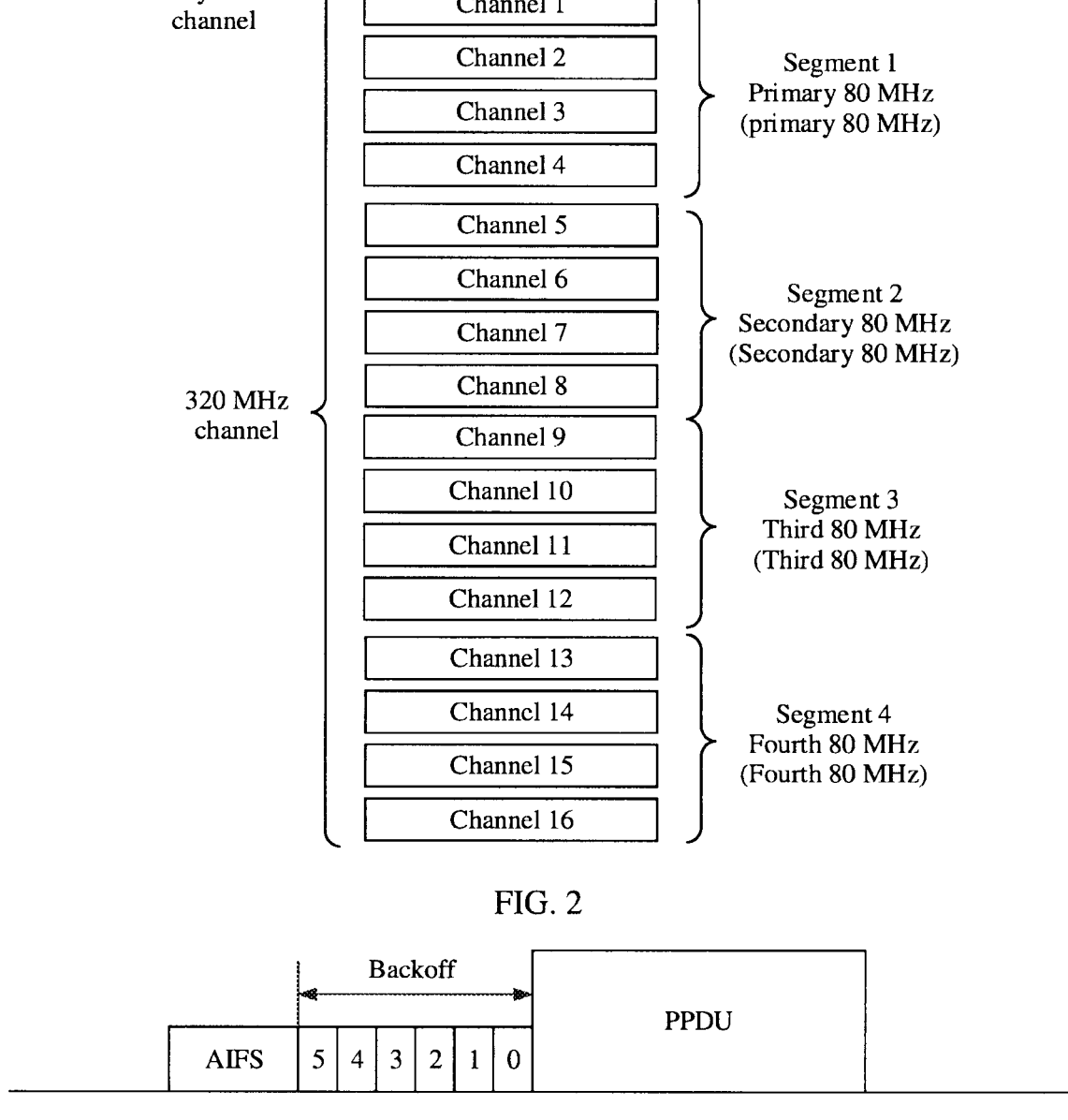
FIG. 2 is another example schematic diagram of channel division of a 320 MHz channel according to an embodiment of this application.
FIG. 3 is an example schematic diagram of a backoff procedure according to an embodiment of this application.

In a WLAN, a contiguous spectrum block for transmission may be referred to as a frequency segment. One WLAN channel may include a plurality of frequency segments, and a bandwidth of each frequency segment may be 80 MHz, 40 MHz, 20 MHz, or 160 MHz. FIG. 2 is another schematic diagram of channel division of a 320 MHz channel according to an embodiment of this application. As shown in FIG. 2, for example, a bandwidth of a segment is 80 MHz, the 320 MHz channel shown in FIG. 2 may be divided into four segments. The frequency segment may alternatively be referred to as a frequency segment, or referred to as a segment for short.

4. Carrier Sense Mechanism

The carrier sense mechanism may be classified into a physical carrier sense mechanism and a virtual carrier sense mechanism.

(1) The physical carrier sense mechanism is also referred to as clear channel assessment (CCA). In a wireless communication system, before a target device needs to transmit data on a channel, the target device first receives data on the channel. If the target device does not find that another device transmits data on the channel after a given time, the target device starts to transmit data. If the target device finds that another device transmits data, the target device waits for a random period of time and then reattempts the process.

Clear channel assessment includes packet detection and energy detection. Packet detection is to detect whether a data packet is transmitted on a channel (whether a data packet is transmitted may be determined by detecting whether a packet header exists). If a data packet exists on the channel and energy exceeds a packet detection threshold, the channel is considered busy. Energy detection is to detect energy on a channel. If energy on a channel is greater than or equal to an energy detection threshold, the channel is considered busy. Only when both results of packet detection and energy detection indicate that the channel is idle, the channel is considered to be in an idle state. In other words, if no packet header is detected in a time period, and energy on the channel is less than the energy detection threshold during energy detection, the channel is considered to be in an idle state.

The "energy detection" separately mentioned below in this application refers to energy detection performed when no packet header is detected. In other words, when a result of the "energy detection" separately mentioned below in this application is that a channel is idle, it indicates that the channel is in an idle state.

(2) The virtual carrier sense mechanism uses information discovered in 802.11 frames to predict a status of a wireless medium. Generally, virtual carrier sense is provided by a NAV. One device may maintain one or more NAVs. The NAV is a timer, and is set based on a value of duration in a MAC header of the frame. A value of the NAV decreases as time elapses. If the NAV is not 0, it indicates that the wireless medium is in a busy state. If the NAV is 0, it indicates that the wireless medium is in an idle state. The wireless medium may be a channel, a frequency band, or the like.

The NAV is set based on a duration value in a MAC header of a frame, and may be specifically implemented as follows: After a station receives a frame, if a receiver address of the frame is not the station and a value of a duration field in the frame is greater than a current value of a NAV of the station, the station may update the NAV based on the duration (duration) field in the received frame; or if a receiver address of the frame is the station (which indicates that the station is a receiving station) or a value of a duration field in the frame is less than or equal to a current value of a NAV of the station, the NAV cannot be updated. The value of the NAV starts from an end moment of the received wireless frame.

5. Backoff Mechanism

An IEEE 802.11 standard allows a plurality of users to share a same transmission medium. A transmitter checks availability of the transmission medium before transmitting data. The IEEE 802.11 standard uses carrier sense multiple access with collision avoidance (CSMA/CA) to implement channel contention. To avoid collision, the CSMA/CA adopts a backoff mechanism.

The backoff mechanism on a single channel is described below. Before a device transmits a message, the device may select a random number from 0 to a contention window (CW), and use the random number as an initial value of a backoff counter. After an idle time of the channel reaches an arbitration inter-frame space (AIFS), a count value of the backoff counter decreases by 1 each time the channel is idle in a timeslot. Before the count value of the backoff counter decreases to 0, if the channel is busy in one timeslot, the backoff counter stops counting. Then, if the channel changes from busy to idle in state and the idle time of the channel reaches the AIFS, the backoff counter resumes counting. When the count value of the backoff counter is 0, the backoff procedure ends, and the device may start data transmission.

With reference to FIG. 3, it is assumed that an initial value of a backoff counter is 5, and after an idle time of a channel reaches an AIFS, the backoff counter starts to perform a backoff Each time the channel is in an idle state in one timeslot, a count value of the backoff counter decreases by 1 until the count value of the backoff counter is 0. After the count value of the backoff counter is 0, the device successfully obtains a channel through contention, and the device may transmit a PPDU on the channel.

The foregoing are technical terms used in embodiments of this application, and are uniformly described herein.

Currently, in a latest Wi-Fi standard (namely, the 802.11be standard), a maximum bandwidth of 320 MHz is supported. In the 802.11be standard, to make full use of a channel, when an AP supports a large bandwidth (for example, 320 MHz), some STAs that support only a small bandwidth (for example, only 80 MHz) are allowed to be scheduled to a specific secondary channel to receive data, to avoid a case in which all STAs that support the small bandwidth are clustered on a primary channel, and few STAs or no STA can send or receive data on the secondary channel.

Therefore, when the AP receives an OBSS frame on the primary channel and sets a network allocation vector (NAV), the AP may switch from the primary channel to a specific secondary channel to perform channel listening and backoff. In this application, the specific secondary channel is referred to as a temporary primary channel. The temporary primary channel may also be referred to as a parking channel, a frame receiving channel, a backup channel, or another name in this application. For ease of description, the following uses the name of temporary primary channel for description. The temporary primary channel may be temporarily used as an operating channel of a station, and the station may park on or operate on the temporary primary channel to receive signaling or data.

Figure 4:
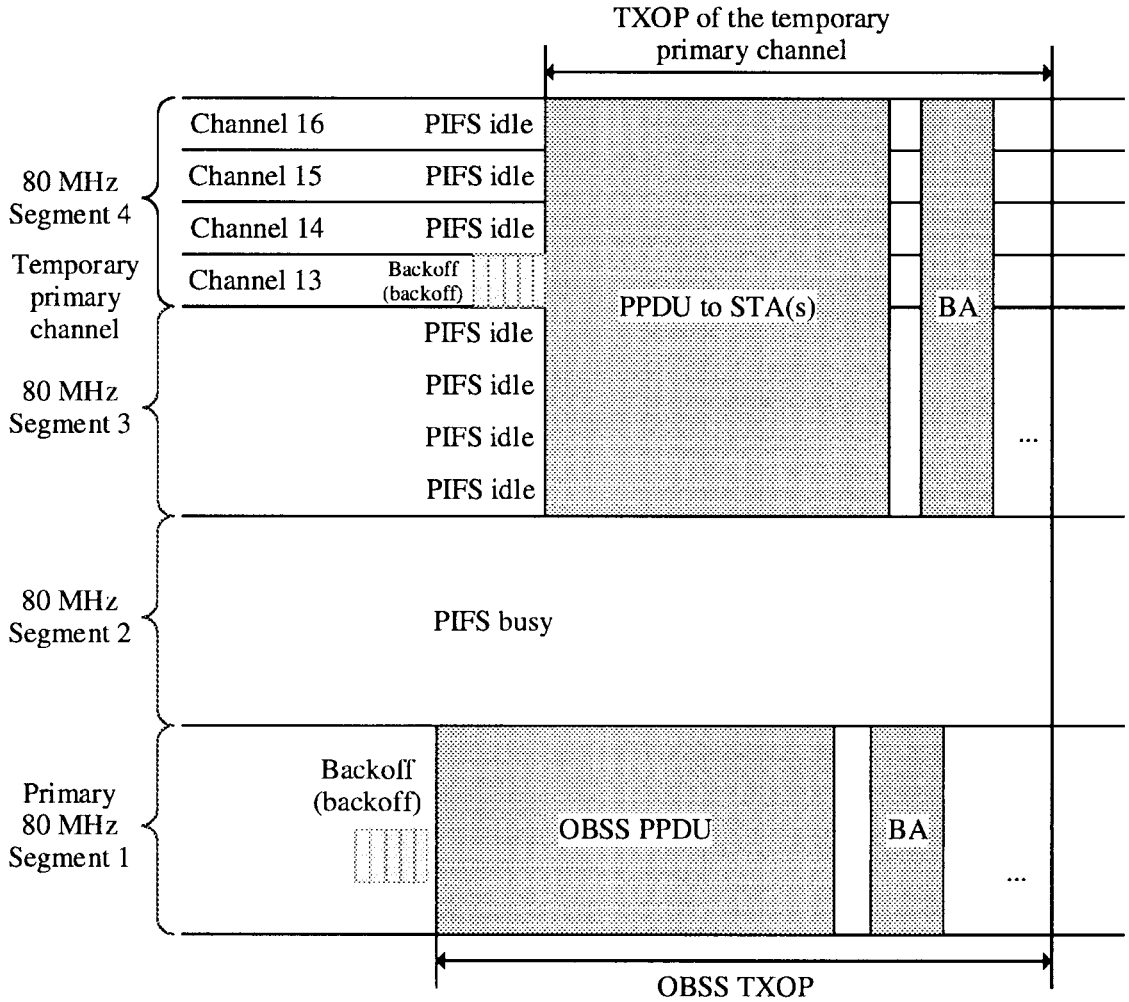
FIG. 4 is an example schematic diagram of channel contention on a temporary primary channel according to an embodiment of this application.

An example is used for description with reference to FIG. 4. The AP may schedule a STA 1 to a primary 20 MHz channel, and schedule a STA 2 to a channel 13. In other words, the channel 13 is a temporary primary channel of the STA 2. When the AP is to send data to the STA 1, the AP first performs backoff on the primary 20 MHz channel. When an OBSS frame is transmitted on a primary 80 MHz channel, the AP may determine that the primary 20 MHz channel is in a busy state. Therefore, the AP may switch to the channel 13 for channel contention. When the channel 13 backs off to 0, the AP may use the channel 13 and other idle subchannels (for example, a channel 14, a channel 15, a channel 16, and an 80 MHz segment 3 in FIG. 4) to send data to the STA 2.

In a related technical solution, the STA 1 parking on the primary 20 MHz channel and the STA 2 parking on the temporary primary channel are not a same STA. In this case, when the primary channel is in the busy state, although the AP may obtain an additional transmission opportunity on the temporary primary channel, data sent by the AP on the temporary primary channel cannot be received by the STA 1 parking on the primary channel. The AP can continue to contend for a channel only after the primary 20 MHz channel is switched from the busy state to an idle state, to send data to the STA 1 parking on the primary 20 MHz channel. Therefore, the related technical solution cannot achieve an objective of reducing a data transmission delay between the AP and the STA 1 or increasing a data transmission throughput between the AP and the STA 1.

To solve this technical problem, an embodiment of this application provides a data transmission method. A specific idea of the data transmission method is as follows: A first device and a second device perform data transmission (or perform backoff) on a primary 20 MHz channel; and when a first preset condition (for example, the primary 20 MHz channel is in the busy state) is met, both the first device and the second device are switched from the primary 20 MHz channel to a pre-negotiated first channel. It should be understood that the first device and the second device may be an AP or a STA.

Compared with the conventional technology in which data can be transmitted between the first device and the second device only after the primary channel is switched from the busy state to the idle state, the technical solutions provided in this application can enable the first device and the second device to transmit data by using another channel in a time period when the primary channel is in the busy state, to effectively reduce a data transmission delay.

An embodiment of this application provides a data transmission method, and the method may be applied to various communication systems, for example, a system using the IEEE 802.11 standard. For example, the IEEE 802.11 standard includes but is not limited to the 802.11be standard or a next-generation 802.11 standard. Scenarios to which the technical solutions of this application are applicable include communication between an AP and a STA, communication between APs, communication between STAs, and the like.

Figure 5:
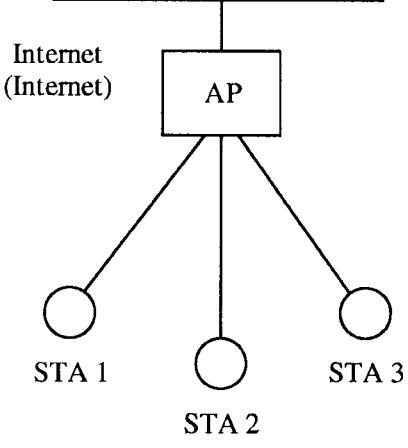
FIG. 5 is an example schematic diagram of a system architecture of a wireless local area network according to an embodiment of this application.

FIG. 5 is a schematic diagram of a system architecture of a wireless local area network according to an embodiment of this application. As shown in FIG. 5, the wireless local area network may include one AP and one or more stations (for example, a STA 1, a STA 2, and a STA 3 in FIG. 5). The AP may access the Internet in a wired or wireless manner, the AP may be associated with a plurality of STAs, and uplink and downlink communication may be performed between the AP and the plurality of associated STAs by using the 802.11 protocol. The 802.11 protocol may include IEEE 802.11be, and may further include protocols such as IEEE 802.11ax and IEEE 802.11ac. It is clear that with continuous evolution and development of communication technologies, the 802.11 protocol may further include a next-generation protocol of IEEE 802.11be, and the like. An apparatus for implementing the method in this application may be an AP or a STA in the WLAN, or a chip or a processing system installed in an AP or a STA.

An access point (the AP in FIG. 5) is an apparatus having a wireless communication function, supports communication by using a WLAN protocol, and has a function of communicating with another device (such as a station or another access point) in a WLAN network. Certainly, the access point may further have a function of communicating with another device. In a WLAN system, the access point may be referred to as an access point station (AP STA). The apparatus having a wireless communication function may be an entire device, or may be a chip or a processing system installed in an entire device. The device in which the chip or the processing system is installed may implement the method and the function in embodiments of this application under control of the chip or the processing system. The AP in embodiments of this application is an apparatus that provides a service for a STA, and may support the 802.11 series protocols. For example, the AP may be a communication entity, for example, a communication server, a router, a switch, or a bridge. The AP may include a macro base station, a micro base station, a relay station, and the like in various forms. Certainly, the AP may alternatively be a chip or a processing system in these devices in various forms, to implement the method and the function in embodiments of this application.

A station (for example, the STA 1, the STA 2, or the STA 3 in FIG. 5) is an apparatus having a wireless communication function, supports communication by using a WLAN protocol, and has a capability of communicating with another station or an access point in a WLAN network. In a WLAN system, the station may be referred to as a non-access point station (non-AP STA). For example, the STA is any user communication device that allows a user to communicate with an AP and further communicate with a WLAN. The apparatus having a wireless communication function may be an entire device, or may be a chip or a processing system installed in an entire device. The device in which the chip or the processing system is installed may implement the method and the function in embodiments of this application under control of the chip or the processing system. For example, the STA may be user equipment that can connect to the Internet, for example, a tablet computer, a desktop computer, a laptop computer, a notebook computer, an ultra-mobile personal computer (UMPC), a handheld computer, a netbook, a personal digital assistant (PDA), or a mobile phone. Alternatively, the STA may be an Internet of things node in the Internet of things, a vehicle-mounted communication apparatus in the Internet of vehicles, an entertainment device, a game device or system, a global positioning system device, or the like. The STA may alternatively be a chip and a processing system in the foregoing terminals.

A WLAN system may provide high-speed and low-delay transmission. With continuous evolution of WLAN application scenarios, the WLAN system is to be applied to more scenarios or industries, for example, the internet of things industry, the internet of vehicles industry, the banking industry, enterprise offices, exhibition halls of stadiums, concert halls, hotel rooms, dormitories, wards, classrooms, supermarkets, squares, streets, production workshops and warehousing. Certainly, a device (such as an access point or a station) that supports WLAN communication may be a sensor node (for example, a smart water meter, a smart electricity meter, or a smart air detection node) in a smart city, a smart device (for example, a smart camera, a projector, a display, a television, a stereo, a refrigerator, or a washing machine) in a smart home, a node in the internet of things, an entertainment terminal (for example, an AR, a VR, or another wearable device), a smart device in smart office (for example, a printer, a projector, a loudspeaker, or a stereo), an internet of vehicles device in the internet of vehicles, an infrastructure (for example, a vending machine, a self-service navigation station of a supermarket, a self-service cash register device, or a self-service ordering machine) in daily life scenarios, a device in a large sports and music venue, and the like. Specific forms of the STA and the AP are not limited in embodiments of this application, and are merely examples for description herein.

Figure 6A:
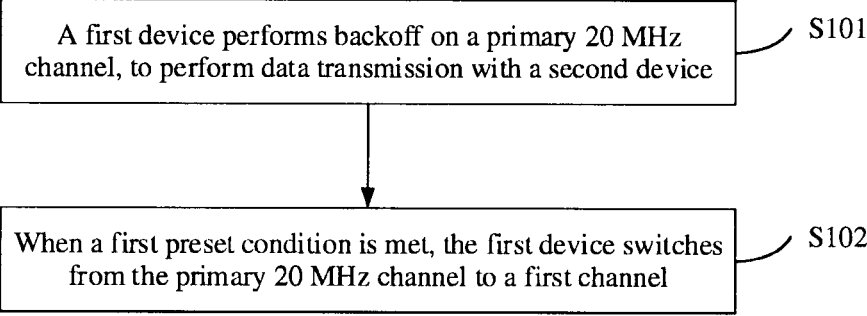
FIG. 6(*a*) is an example flowchart of a data transmission method according to an embodiment of this application.

For a first device, FIG. 6(a) shows a data transmission method according to an embodiment of this application. The method includes the following steps.

S101: The first device performs backoff on a primary 20 MHz channel, to perform data transmission with a second device.

The first device may be an AP or a STA. The second device may be an AP or a STA.

In this embodiment of this application, the first device may configure an initial value of a backoff counter on the primary 20 MHz channel based on a contention window on the primary 20 MHz channel. In addition, each time the primary 20 MHz channel is in an idle state in a timeslot, the first device may decrease a count value of the backoff counter on the primary 20 MHz channel by 1. If the primary 20 MHz channel changes to a busy state at a moment, the first device suspends backoff. Then, the first device needs to wait until an idle time of the primary 20 MHz channel reaches a preset inter-frame space, before continuing to perform backoff.

After the backoff counter of the primary 20 MHz channel is decreased to 0, the first device may determine, on a primary channel between the first device and the second device, a second channel for data transmission. The second channel includes one or more subchannels that are in an idle state and that are in the primary channel at a moment when the backoff counter is decreased to 0.

The primary channel between the first device and the second device includes the primary 20 MHz channel. For example, the primary channel may be the primary 20 MHz channel, or may be a primary 40 MHz channel, a primary 80 MHz channel, or a primary 160 MHz channel. This is not limited in this embodiment of this application. Preamble puncturing may be used on the primary channel, or preamble puncturing may not be used on the primary channel.

The primary channel between the first device and the second device may be determined by the first device and the second device through negotiation, or may be defined in a standard.

It should be understood that, before the backoff counter that is of the primary 20 MHz channel and that is configured by the first device is decreased to 0, or in a process in which the first device and the second device perform data transmission on the second channel, the first device may perform the following step S102.

S102: When a first preset condition is met, the first device switches from the primary 20 MHz channel to a first channel.

The first channel is a channel preconfigured for communication between the first device and the second device. The first channel does not include the primary 20 MHz channel.

It should be understood that, before the embodiment shown in FIG. 6(a) is performed, the first device and the second device may negotiate with each other to determine the first channel; or the first device and the second device may determine the first channel according to a standard.

For example, when the first channel is defined in a standard, the first channel may be one of the following cases: (1) The first channel is a secondary 20 MHz channel; or (2) the first channel is a 20 MHz channel with a lowest frequency in an 80 MHz channel; or (3) the first channel is a 20 MHz channel with a highest frequency in an 80 MHz channel. Optionally, the 80 MHz channel may be any 80 MHz channel in a 320 MHz channel.

In this embodiment of this application, the first channel is located in a bandwidth supported by the first device, and is also located in a bandwidth supported by the second device. In this way, both the first device and the second device can use the first channel, to ensure that data can be normally transmitted between the first device and the second device on the first channel.

It should be understood that the first channel determined by the first device and the first channel determined by the second device are a same channel, to ensure that the first device and the second device can switch from the primary 20 MHz channel to the same channel, and ensure that data transmission can be performed between the first device and the second device on the first channel.

A bandwidth of the first channel is not limited in this embodiment of this application. For example, the bandwidth of the first channel may be 20 MHz, 40 MHz, 80 MHz, or another type of bandwidth. Preamble puncturing may be used on the first channel, or preamble puncturing may not be used on the first channel.

In this embodiment of this application, the first preset condition at least includes that the primary 20 MHz channel is in the busy state.

It should be understood that, that the primary 20 MHz channel is in the busy state indicates that the primary channel between the first device and the second device cannot be used. Therefore, the first device may switch from the primary 20 MHz channel to the first channel to obtain an additional transmission opportunity, to perform data transmission with the second device before the primary 20 MHz channel is idle, so that a data transmission delay can be reduced.

Optionally, that the primary 20 MHz channel is in the busy state may include at least one of the following cases.

Case 1-1: The first device receives a first OBSS frame on the primary 20 MHz channel.

For example, after receiving a radio frame, the first device may determine, based on a SIG A field in the radio frame or an address field in a MAC frame header in the radio frame, whether the radio frame is an OBSS frame. For example, if a BSS color in an HE SIG A (or EHT SIG A) field in the radio frame is different from a BSS color to which the first device belongs, the first device may determine that the radio frame is an OBSS frame. For another example, if a BSSID in the MAC frame header in the radio frame is different from a BSSID of a BSS to which the first device belongs, the first device may determine that the radio frame is an OBSS frame. The foregoing content is only a brief introduction to a specific implementation in which the first device determines whether a radio frame is an OBSS frame. For specific details, refer to the conventional technology.

Case 1-2: The first device determines that an energy detection result of the primary 20 MHz channel is a busy state.

Optionally, the first device performs energy detection on the primary 20 MHz channel. When an energy detection value on the primary 20 MHz channel is greater than or equal to an energy detection threshold, the first device determines that the energy detection result on the primary 20 MHz channel is the busy state. Conversely, the first device determines that the energy detection result on the primary 20 MHz channel is an idle state. The energy detection threshold is set to −62 dBm.

Cases 1-3: The first device determines that a value of a first NAV on the primary 20 MHz channel is greater than 0.

Optionally, if the first device maintains two NAVs, for example, an NAV of another cell, namely, a basic NAV, and an NAV of a local cell, namely, an intra-BSS NAV, the first NAV may be the basic NAV. If the communication device can maintain only one NAV (regardless that a frame is from a local cell or another cell, if a receiver address of the frame is not the communication device and a value of a duration field in the frame is greater than a current value of the NAV, the NAV is updated), the first NAV is the NAV maintained by the communication device.

Optionally, the first preset condition may further include that target duration is greater than or equal to first preset duration. The first preset duration may be determined by the first device and the second device through negotiation, or may be defined in a standard.

When the primary 20 MHz channel is in the busy state as in the Case 1-1, the target duration may be remaining transmission duration of the first OBSS frame, or the target duration may be remaining timing duration of the first NAV on the primary 20 MHz channel.

When the primary 20 MHz channel is in the busy state as in the Case 1-2 or the Case 1-3, the target duration may be remaining timing duration of the first NAV on the primary 20 MHz channel.

It should be understood that, after switching to the first channel, the first device further needs to perform channel contention before sending data. Considering a time required for channel contention and a data sending time, if the target duration is short (that is, the target duration is less than the first preset duration), it may be difficult for the first device to perform data transmission with the second device on the first channel within the target duration. In this case, it is less necessary for the first device to switch from the primary 20 MHz channel to the first channel. Therefore, when the target duration is less than the first preset duration, the first device does not switch from the primary 20 MHz channel to the first channel. This can simplify operations.

If the target duration is long (that is, the target duration is greater than or equal to the first preset duration), there is a high probability that the first device can obtain a transmission opportunity on the first channel to transmit data. In this case, the first device switches from the primary 20 MHz channel to the first channel. This helps obtain an additional transmission opportunity to reduce a data transmission delay.

Optionally, that the first device switches from the primary 20 MHz channel to the first channel may be specifically implemented as follows: A function module, such as a physical frame header synchronization module or a packet parsing module, configured for the first device, processes a signal received on the first channel.

It should be understood that a process in which the first device switches from the primary 20 MHz channel to the first channel is merely a switching process of a digital processing module, and does not involve frequency switching of a radio frequency and analog component. Therefore, a delay generated in the process in which the first device switches from the primary 20 MHz channel to the first channel is small, and is usually negligible.

Based on the embodiment shown in FIG. 6(a), because the first preset condition at least includes that the primary 20 MHz channel is in the busy state, when the preset condition is met, data transmission cannot be performed between the first device and the second device by using the primary 20 MHz channel. However, when the first preset condition is met, if the first device switches from the primary 20 MHz channel to the first channel, before the primary 20 MHz channel switches from the busy state to the idle state, there is a probability that the first device can obtain an additional transmission opportunity, so as to perform data transmission with the second device. Compared with the conventional technology in which data can be transmitted between the first device and the second device only after the primary 20 MHz channel is switched from the busy state to the idle state, this embodiment of this application provides a probability for the first device and the second device to perform data transmission when the primary 20 MHz channel is in the busy state. Therefore, there is a probability that a data transmission delay between the first device and the second device is reduced, and a data throughput between the first device and the second device can be improved.

Figures 6B, 6C:
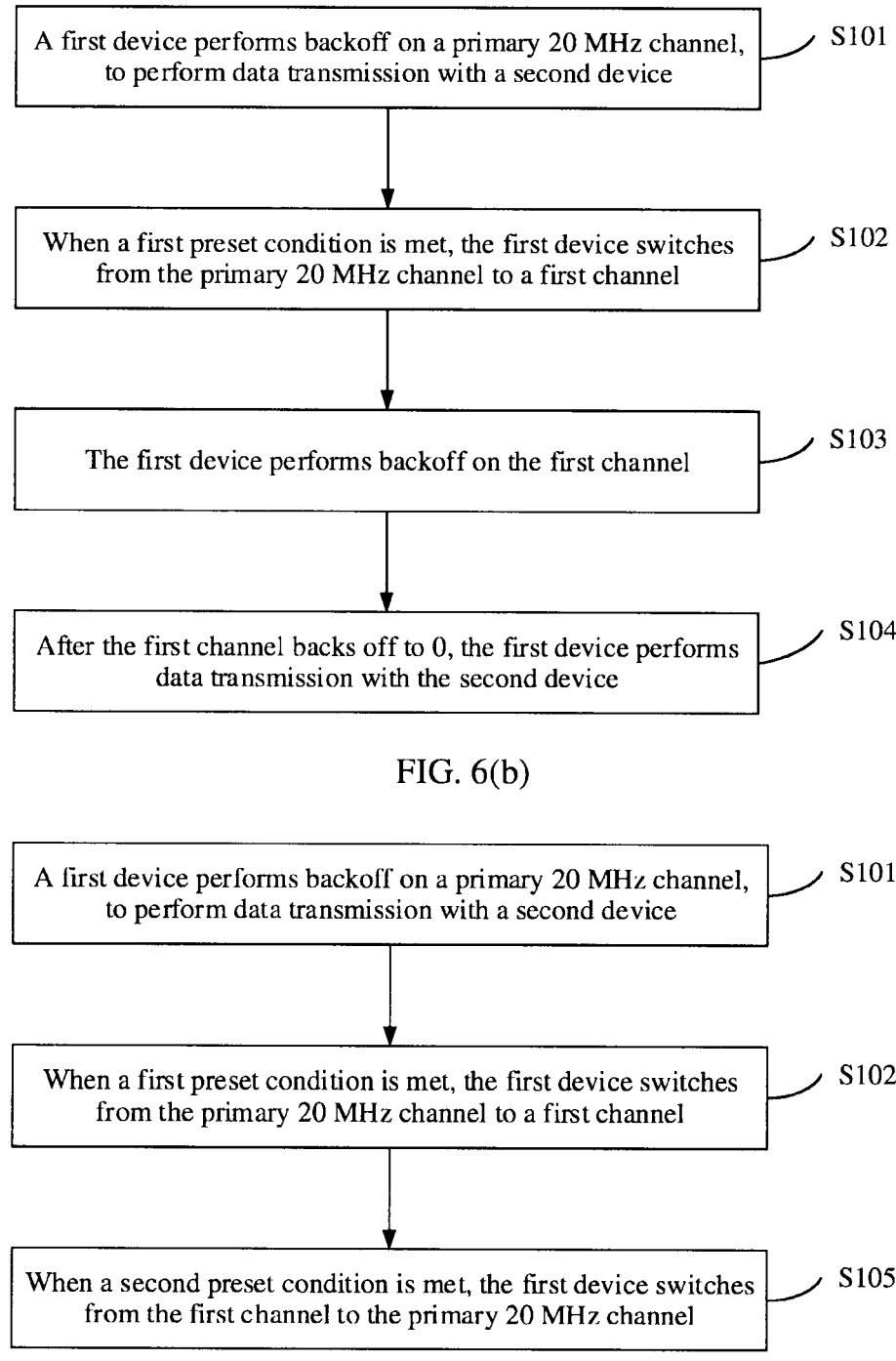

Optionally, based on the embodiment shown in FIG. 6(a), as shown in FIG. 6(b), after step S102, the data transmission method may further include step S103. Optionally, the data transmission method may further include step S104.

S103: The first device performs backoff on the first channel.

The first channel may include one or more subchannels. Optionally, a bandwidth of the subchannel included in the first channel may be 20 MHz.

Optionally, when the first channel includes a plurality of subchannels, step S103 may be performed in one of the following implementations:

Implementation 1 of step S103: The first device performs backoff on each of the plurality of subchannels.

Based on the implementation 1, the first device configures a backoff counter for each of the plurality of subchannels. It should be understood that initial values of backoff counters of different subchannels may be configured to be a same value or different values. This is not limited.

It should be understood that advantages of the implementation 1 are that the implementation 1 has high flexibility, and a transmission opportunity can be quickly obtained when channel load is low, so that a probability of obtaining the transmission opportunity can be increased.

Optionally, if the implementation 1 is used in step S103, the first device further needs to perform the following operation 1 or operation 2 in a process in which the first device performs backoff.

Operation 1: If the first device synchronizes to a physical frame header on any subchannel of the first channel, the first device suspends backoff on all subchannels of the first channel, and determines whether a physical frame corresponding to the physical frame header is an OBSS frame. If the physical frame corresponding to the physical frame header is an OBSS frame, the first device continues to perform backoff on each subchannel of the first channel. If the physical frame corresponding to the physical frame header is not an OBSS frame, the first device continues to suspend backoff on all subchannels of the first channel until transmission of the physical frame corresponding to the physical frame header is completed. Alternatively, if the physical frame corresponding to the physical frame header is not an OBSS frame, the first device continues to suspend backoff on all subchannels of the first channel until an NAV configured for the physical frame corresponding to the physical frame header is reduced to 0.

If the physical frame corresponding to the physical frame header is not an OBSS frame, it indicates that the physical frame corresponding to the physical frame header is a frame of the BSS to which the first device belongs.

For the first channel, the NAV configured for the physical frame corresponding to the physical frame header is an NAV configured by the first device based on a duration field in the physical frame.

That the first device continues to perform backoff on each subchannel of the first channel specifically means that, for each subchannel, the first device determines, based on a busy/idle state of the subchannel, whether to decrease a count value of a backoff counter corresponding to the subchannel by 1. It should be understood that, for a subchannel for transmitting an OBSS frame, the first device may detect that the subchannel is in a busy state. Therefore, the first device suspends counting of a backoff counter corresponding to the subchannel.

It should be understood that the operation 1 requires that a physical frame header synchronization module is configured for the first device on each subchannel of the first channel.

Optionally, the operation 1 further requires that at least one set of packet parsing modules is configured for the first device.

It should be understood that, if a subchannel of the first channel backs off to 0 in a time period in which the first device receives a physical frame sent to the first device, the first device is triggered to send the physical frame. As a result, in a same time period, the first device receives a physical frame on a subchannel, and sends the physical frame on another subchannel. In this case, if the first device does not have a simultaneous transmit/receive capability, a transmit/receive conflict occurs in the first device. Therefore, a beneficial effect of the operation 1 is as follows: Starting from synchronizing to a physical frame header on any subchannel of the first channel, backoff on all subchannels is suspended, to avoid a problem that the transmit/receive conflict occurs on the first device.

Operation 2: The first device receives a physical frame on any subchannel of the first channel. If the first device determines that the physical frame is from the BSS to which the first device belongs, the first device suspends backoff on all subchannels of the first channel until transmission of the physical frame is completed. Alternatively, if the first device determines that the physical frame is from the BSS to which the first device belongs, the first device suspends backoff on all subchannels of the first channel until an NAV configured for the physical frame is reduced to 0.

It should be understood that the operation 2 requires that a physical frame header synchronization module and a packet parsing module are configured for the first device on each subchannel of the first channel.

A beneficial effect of the operation 2 is as follows: If the first device determines that a physical frame received on a subchannel is from the BSS to which the first device belongs, the first device suspends backoff on all subchannels, to avoid that a subchannel backs off to 0 in a process of receiving the physical frame, so that a possibility of the problem that the transmit/receive conflict occurs on the first device is reduced.

Implementation 2 of step S103: The first device performs backoff on one of the plurality of subchannels. When the subchannel is in a busy state, the first device switches, based on a preset sequence, to another subchannel in the plurality of subchannels to perform backoff.

It should be understood that advantages of the implementation 2 are as follows: (1) Only one set of packet parsing modules needs to be configured for the first device, and a requirement for a device capability is low. (2) When one subchannel is in a busy state, the first device switches to another subchannel to perform backoff. This helps obtain a transmission opportunity as soon as possible and increases a probability of obtaining the transmission opportunity.

The implementation 2 of step S103 is described by using an example. It is assumed that the first channel configured between the first device and the second device includes a subchannel 1 to a subchannel 4. A preset sequence is: the subchannel 4, the subchannel 2, the subchannel 3, and the subchannel 1. Therefore, when the first preset condition is met, the first device first switches from the primary 20 MHz channel to the subchannel 4, and performs backoff on the subchannel 4. When the subchannel 4 is in a busy state, the first device switches from the subchannel 4 to the subchannel 2 to perform backoff. When the subchannel 2 is in a busy state, the first device switches from the subchannel 2 to the subchannel 3 to perform backoff. When the subchannel 3 is in a busy state, the first device switches from the subchannel 3 to the subchannel 1 to perform backoff.

Optionally, the preset sequence may be implemented in any one of the following implementations.

Implementation 1: The preset sequence is a sequence in which a plurality of subchannels are sorted based on priorities. A priority of each subchannel may be determined by the first device and the second device through negotiation, or may be defined in a standard.

Implementation 2: The preset sequence is a sequence in which a plurality of subchannels are sorted in descending order of frequencies. Alternatively, the preset sequence may be a sequence in which the plurality of subchannels are sorted in ascending order of frequencies.

Implementation 3: The preset sequence may be a sequence in which a plurality of subchannels are sorted in ascending order of channel load.

Implementation 4: The preset sequence is a sequence generated by randomly sorting a plurality of subchannels.

It should be understood that the foregoing implementation 1 to implementation 4 are merely examples of the preset sequence, and this embodiment of this application is not limited thereto.

It should be noted that the first device and the second device use a same preset sequence, to ensure that the first device and the second device can switch to a same channel.

In this embodiment of this application, that the subchannel is in a busy state includes at least one of the following cases.

Case 2-1: The first device receives a second OBSS frame on the subchannel.

Case 2-2: The first device detects no radio frame, but duration in which the first device determines that an energy detection result on the subchannel is a busy state is greater than or equal to second preset duration.

In this embodiment of this application, in a process of performing backoff on the subchannel, the first device performs energy detection on the subchannel. When an energy detection value on the subchannel is greater than or equal to the energy detection threshold, the first device determines that the energy detection result on the subchannel is the busy state. Alternatively, when an energy detection value on the subchannel is less than the energy detection threshold, the first device determines that the energy detection result on the subchannel is an idle state.

It should be understood that, after the first device switches from the primary 20 MHz channel to the first channel, because the first device lacks a record of a related NAV on the first channel, if the first device sets the energy detection threshold to −62 dBm according to an existing CCA rule, channels of traditional stations may be preempted, and fairness is affected.

Based on this, in this embodiment of this application, the energy detection threshold of the subchannel is set to a value less than −62 dBm and greater than −82 dBm, to ensure fairness.

Case 2-3: The first device determines that a value of a second NAV on the subchannel is greater than 0.

In this embodiment of this application, an initial value of a backoff counter on the first channel (or the subchannel on the first channel) may be set according to the following rules.

Rule 1: The first device sets the initial value of the backoff counter on the first channel (or the subchannel of the first channel) based on a minimum contention window CW_min or a contention window of the primary 20 MHz channel.

Rule 2: When a count value of a backoff counter on the primary 20 MHz channel is not 0, the first device sets the initial value of the backoff counter on the first channel (or the subchannel on the first channel) based on the count value of the backoff counter on the primary 20 MHz channel. Optionally, the contention window of the primary 20 MHz channel is a contention window of the first channel.

For example, the first device may set the initial value of the backoff counter on the first channel (or the subchannel on the first channel) to the count value of the backoff counter on the primary 20 MHz channel.

Rule 3: The first device sets the initial value of the backoff counter on the first channel (or the subchannel of the first channel) based on a preset contention window.

The preset contention window may be defined in a communication standard, or may be defined by the first device.

S104: After the first channel backs off to 0, the first device performs data transmission with the second device.

Optionally, that the first channel backs off to 0 may mean that a target subchannel on the first channel backs off to 0. The target subchannel is any subchannel of the first channel.

Optionally, after the target subchannel backs off to 0, the first device may perform data transmission with the second device on the target subchannel. Alternatively, the first device may perform data transmission on a third channel including the target subchannel. In addition to the target subchannel, the third channel may further include another subchannel that is in an idle state and that is of the first channel.

In a possible implementation, the first device and the second device may transmit data of any service type on the first channel.

In another possible implementation, the first device and the second device only transmit data of a target service type on the first channel, to ensure that the data of the target service type is transmitted. In this way, it can be avoided that a transmission delay of the data of the target service type is increased because data of a non-target service type preempts the first channel.

Optionally, the data of the target service type may be determined by the first device and the second device through negotiation, or may be defined in a communication standard.

Based on the embodiment shown in FIG. 6(b), the first device performs backoff on the first channel, to obtain an additional transmission opportunity, so as to effectively reduce a transmission delay between the first device and the second device, and increase a data transmission throughput between the first device and the second device.

Optionally, based on the embodiment shown in FIG. 6(a), as shown in FIG. 6(c), after step S102, the data transmission method may further include step S105.

S105: When a second preset condition is met, the first device switches from the first channel to the primary 20 MHz channel.

In a possible implementation, the second preset condition is: before switching duration reaches target duration, or when switching duration reaches target duration. Based on this implementation, a timer may be set for the first device, and timing duration of the timer is the target duration. Therefore, before the timer expires, the first device may determine, based on an actual situation, whether to switch from the first channel to the primary 20 MHz channel. When the timer is about to expire, the first device needs to switch from the first channel to the primary 20 MHz channel.

In another possible implementation, the second preset condition is that switching duration reaches third preset duration. Based on this implementation, a timer may be set for the first device, and timing duration of the timer is the third preset duration. Therefore, before the timer expires, the first device does not perform an operation of switching from the first channel to the primary 20 MHz channel. When the timing time of the timer reaches the third preset duration, the first device switches from the first channel to the primary 20 MHz channel.

The switching duration is duration in which the first device switches from the primary 20 MHz channel to the first channel. In other words, the switching duration is duration from a moment at which the first device switches from the primary 20 MHz channel to the first channel to a current moment.

Optionally, the third preset duration is less than or equal to the target duration. The third preset duration may be determined by the first device and the second device through negotiation, or may be defined in a standard.

Optionally, the target duration may be the remaining transmission duration of the first OBSS frame received by the first device on the primary 20 MHz channel. Alternatively, the target duration may be the remaining timing duration of the first NAV on the primary 20 MHz channel.

In this embodiment of this application, that the first device switches from the first channel to the primary 20 MHz channel may be specifically implemented as follows: The function module, such as the physical frame header synchronization module or the packet parsing module, configured for the first device, processes a signal received on the primary 20 MHz channel.

Optionally, if the target duration is the remaining transmission duration of the first OBSS frame received by the first device on the primary 20 MHz channel, after switching from the first channel to the primary channel, the first device may continue to perform backoff according to the existing CCA rule.

It should be understood that, in a time period for receiving the first OBSS frame, the primary 20 MHz channel is already occupied, another station usually does not send another physical frame, and the first device and the second device cannot continue to perform backoff on the primary 20 MHz channel. Therefore, the first device and the second device cannot transmit data on the primary 20 MHz channel. Therefore, in the time period for receiving the first OBSS frame, the first device does not miss another physical frame, so that the first device does not miss an opportunity of updating the first NAV on the primary 20 MHz channel. Therefore, even if the first device continues to perform backoff according to the existing CCA rule after switching from the first channel to the primary channel, transmission of another station is not affected, and a fairness problem is not caused.

In the existing CCA rule, the energy detection threshold is −62 dBm.

Optionally, if the target duration is the remaining timing duration of the first NAV on the primary 20 MHz channel, after switching from the first channel to the primary 20 MHz channel, the first device needs to perform a blind recovery operation on the primary 20 MHz channel.

It should be understood that, within the remaining timing duration of the first NAV on the primary 20 MHz channel, another physical frame may be transmitted on the primary 20 MHz channel. In this case, because the first device switches to the first channel, the first device misses receiving the physical frame. If the physical frame causes the first NAV on the primary 20 MHz channel to be updated, the first device misses an update opportunity of the first NAV. In this way, the first device loses a NAV record on the primary 20 MHz channel. In this case, if the first device performs backoff according to the existing CCA rule after switching from the first channel to the primary 20 MHz channel, transmission of another station may be affected. Therefore, from a perspective of fairness, after switching from the first channel to the primary channel, the first device needs to perform the blind recovery operation.

For example, the blind recovery operation may include that the first device sets fourth preset duration after switching to the primary 20 MHz channel. Within the fourth preset duration, the energy detection threshold of the CCA is a value between −62 dBm and −82 dBm. In addition, after performing backoff, the first device needs to first perform request to send/clear to send (RTS/CTS) interaction before transmitting data. The fourth preset duration may be referred to as a NAVSyncDELAY time period. The fourth preset duration is duration at a millisecond level, for example, 5 milliseconds.

Optionally, if the target duration is the remaining timing duration of the first NAV on the primary 20 MHz channel, after switching from the first channel to the primary 20 MHz channel, the first device continues to perform backoff according to the existing CCA rule.

It should be understood that although the first device may miss an update opportunity of the first NAV on the primary 20 MHz channel within the remaining timing duration of the first NAV on the primary 20 MHz channel, a probability of missing the update opportunity is low. Therefore, when the update opportunity of the first NAV of the primary 20 MHz channel is not missed by default, after switching from the first channel to the primary 20 MHz channel, the first device continues to perform backoff according to the existing CCA rule, so that the first device can obtain a channel through contention as soon as possible.

Based on the embodiment shown in FIG. 6(c), when the second preset condition is met, the first device switches from the first channel to the primary 20 MHz channel, so that the first device and the second device can transmit data on the primary 20 MHz channel.

In addition, when the second preset condition is met, there is a low probability that the first device misses the NAV update opportunity on the primary 20 MHz channel, so that the first device can perform backoff on the primary 20 MHz channel according to the existing CCA rule.

Figures 7A, 7B:
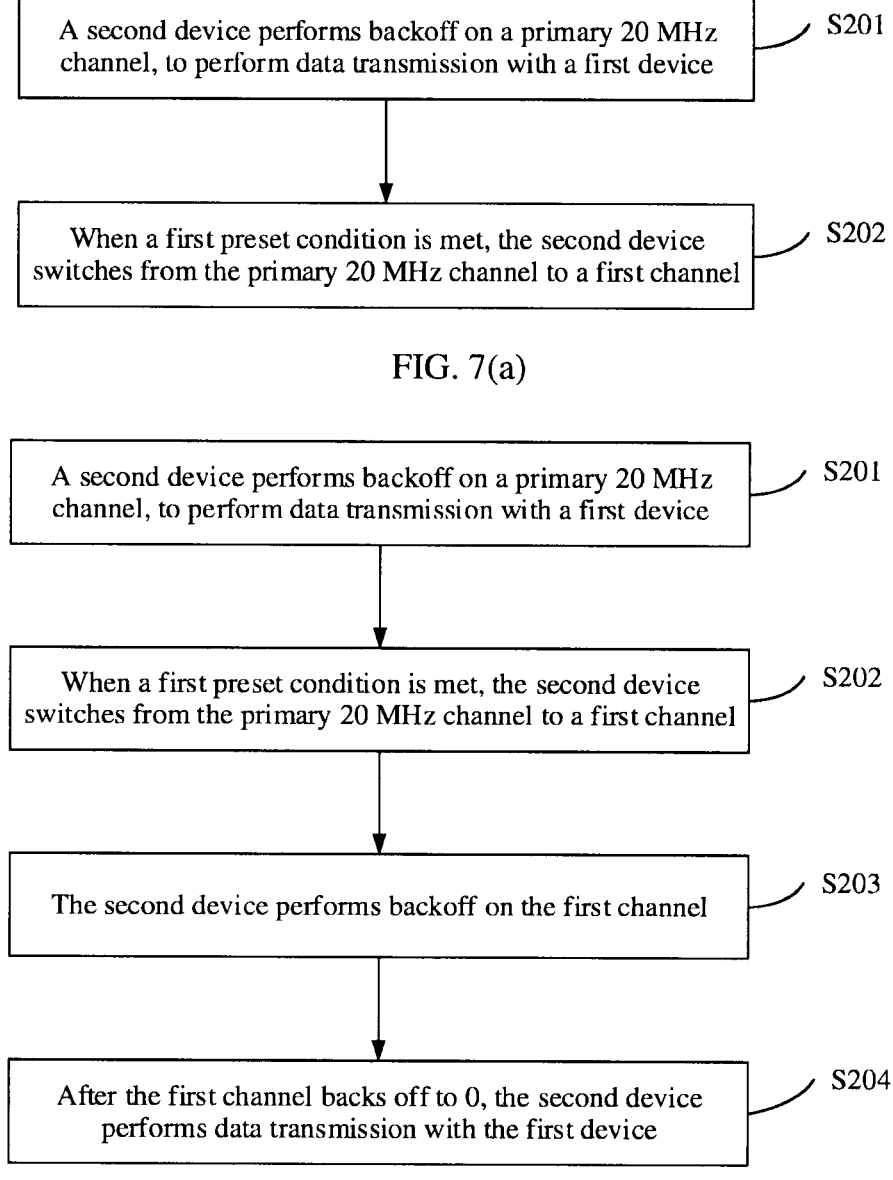
FIG. 7(*a*) is an example flowchart of a data transmission method according to an embodiment of this application.

For the second device, FIG. 7(a) shows a data transmission method according to an embodiment of this application. The method includes the following steps.

S201: The second device performs backoff on the primary 20 MHz channel, to perform data transmission with the first device.

S202: When the first preset condition is met, the second device switches from the primary 20 MHz channel to the first channel.

Steps S201 and S202 are similar to steps S101 and S102 in FIG. 6(a). For specific details, refer to the embodiment shown in FIG. 6(a).

It should be understood that the first device performs the embodiment shown in FIG. 6(a), and the second device performs the embodiment shown in FIG. 7(a), to ensure that the first device and the second device switch from the primary 20 MHz channel to the first channel under a same condition. Therefore, the first device and the second device may obtain an additional transmission opportunity on the first channel to perform data transmission, to reduce a data transmission delay caused because the primary 20 MHz channel is busy.

Optionally, based on the embodiment shown in FIG. 7(a), as shown in FIG. 7(b), after step S202, the data transmission method may further include step S203. Optionally, the data transmission method may further include step S204.

S203: The second device performs backoff on the first channel.

S204: After the first channel backs off to 0, the second device performs data transmission with the first device.

Steps S203 and S204 are similar to steps S103 and S104 in FIG. 6(b). For specific details, refer to the embodiment shown in FIG. 6(b).

Based on the embodiment shown in FIG. 7(b), the second device performs backoff on the first channel, to obtain an additional transmission opportunity, so as to effectively reduce a transmission delay between the first device and the second device.

Figures 7C, 8A:
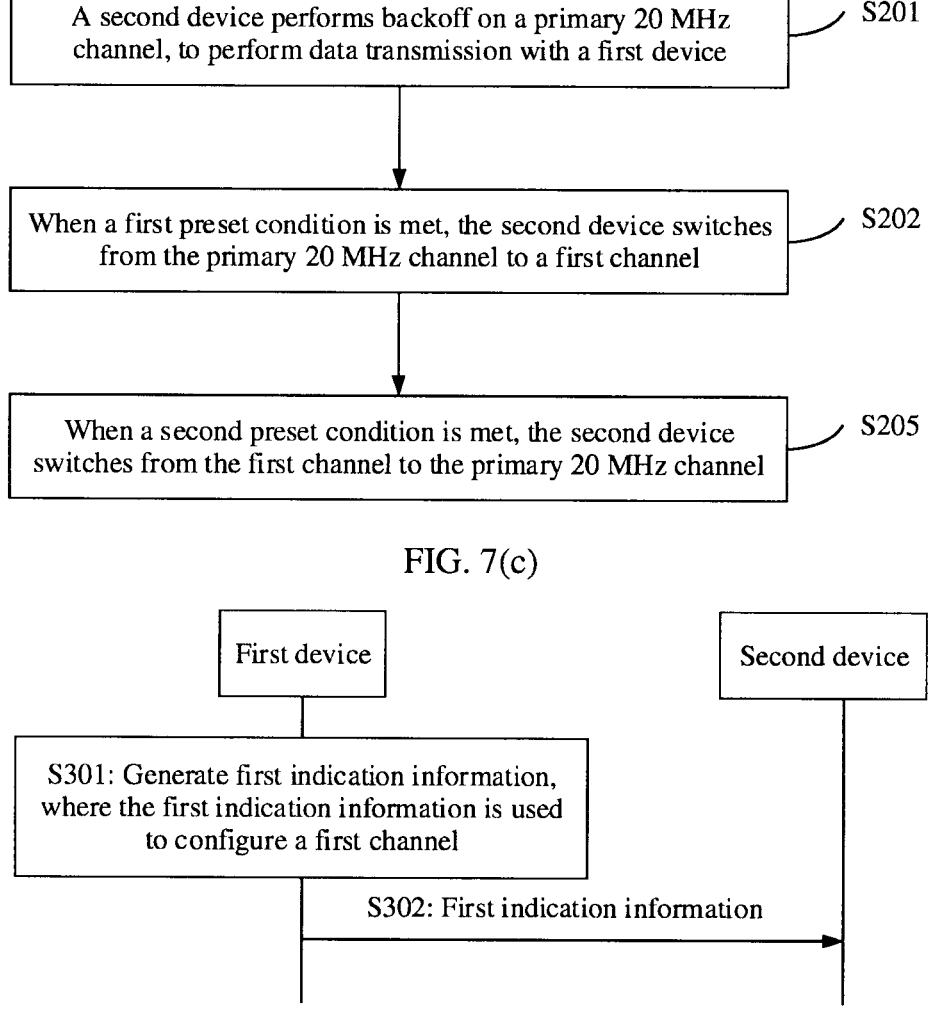
FIG. 8(*a*) is an example flowchart of another data transmission method according to an embodiment of this application.

Optionally, based on the embodiment shown in FIG. 7(a), as shown in FIG. 7(c), after step S202, the data transmission method may further include step S205.

S205: When the second preset condition is met, the second device switches from the first channel to the primary 20 MHz channel.

Step S205 is similar to step S105 in FIG. 6(c). For specific details, refer to the embodiment shown in FIG. 6(c).

It should be understood that the first device performs step S105 in FIG. 6(c), and the second device performs step S205 in FIG. 7(c), to ensure that the first device and the second device switch from the first channel to the primary 20 MHz channel as synchronously as possible. In this way, the first device and the second device may communicate on the primary 20 MHz channel.

The following describes a specific implementation in which the first device and the second device negotiate to determine the first channel. It should be understood that the following embodiments shown in FIG. 8(a), FIG. 8(b), FIG. 9(a), or FIG. 9(b) may be used in combination with the embodiments shown in FIG. 6(a), FIG. 6(b), FIG. 6(c), FIG. 7(a), FIG. 7(b), and FIG. 7(c).

In a possible example, FIG. 8(a) shows a data transmission method according to an embodiment of this application. The method includes the following steps.

S301: The first device generates first indication information.

The first indication information is carried in a management frame, a control frame, or an action frame. The first indication information may be carried in an existing frame or a newly added frame.

In this embodiment of this application, the first indication information is used to configure the first channel, and any one of the following implementations may be used:

Implementation 1: The first indication information includes an index of the first channel. Alternatively, the first indication information includes an index of each subchannel of the first channel.

Implementation 2: The first indication information includes a bitmap, where the bitmap includes a plurality of bits, and each bit corresponds to one 20 MHz channel. For each bit in the bitmap, when a value of a bit is a first value, a 20 MHz channel corresponding to the bit is a subchannel of the first channel. When a value of a bit is a second value, a 20 MHz channel corresponding to the bit is not a subchannel of the first channel. For example, the first value is 1, and the second value is 0. Alternatively, the first value is 0, and the second value is 1. It should be understood that, when the bitmap includes a bit corresponding to the primary 20 MHz channel, the bit corresponding to the primary 20 MHz channel is set to the second value by default.

Optionally, the first indication information is applicable only to the second device. Therefore, the first channel indicated by the first indication information is only a channel for communication between the first device and the second device. In this case, a radio frame that carries the first indication information may further carry indication information used to configure a channel for communication between the first device and another device.

Optionally, the first indication information is applicable to a plurality of devices associated with a transmit end (that is, the first device). Therefore, the first channel indicated by the first indication information is not only a channel for communication between the first device and the second device, but also a channel for communication between the first device and another device.

In a possible implementation, the first device may determine a location of the first channel in a frequency band based on an actual situation (for example, a load status of each secondary channel). Then, the first device generates the first indication information based on the location of the first channel in the frequency band.

S302: The first device sends the first indication information to the second device. Correspondingly, the second device receives the first indication information sent by the first device.

It should be understood that after receiving the first indication information, the second device may determine the first channel based on the first indication information.

Based on the embodiment shown in FIG. 8(a), the first device sends the first indication information to the second device, so that the first device and the second device can determine a same first channel.

Figures 8B, 9A:
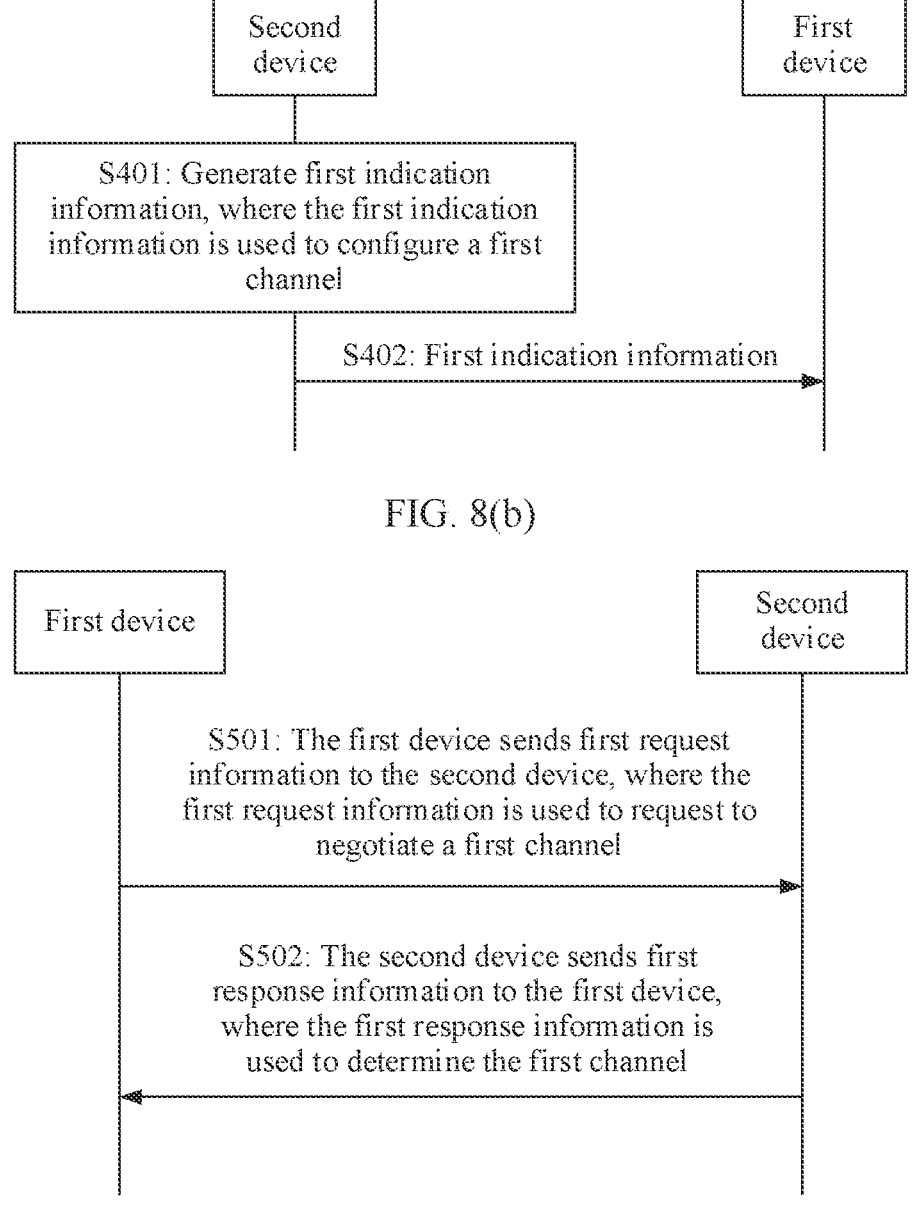
FIG. 9(*a*) is an example flowchart of another data transmission method according to an embodiment of this application.

In another possible example, FIG. 8(b) shows another data transmission method according to an embodiment of this application. The method includes the following steps.

S401: The second device generates first indication information.

For related descriptions of the first indication information, refer to the foregoing description.

S402: The second device sends the first indication information to the first device. Correspondingly, the first device receives the first indication information sent by the second device.

It should be understood that after receiving the first indication information, the first device may determine the first channel based on the first indication information.

Based on the embodiment shown in FIG. 8(b), the second device sends the first indication information to the first device, so that the first device and the second device can determine a same first channel.

In another possible example, FIG. 9(a) shows a data transmission method according to an embodiment of this application. The method includes the following steps.

S501: The first device sends first request information to the second device. Correspondingly, the second device receives the first request information sent by the first device.

The first request information may be carried in an association request frame, or a control type in an A-Control field, or a request frame of an independent frame type.

In this embodiment of this application, the first request information is used to request to negotiate the first channel.

In a possible implementation, the first request information does not indicate a recommended first channel.

In another possible implementation, the first request information further indicates a recommended first channel. The recommended first channel is a first channel recommended by the first device to be used by the second device, but is not necessarily an actually used first channel.

Optionally, the first request information further indicates the recommended first channel, and any one of the following implementations may be used:

Implementation 1: The first request information includes an index of the recommended first channel. Alternatively, the first request information includes an index of each subchannel of the recommended first channel.

Implementation 2: The first request information includes a bitmap, where the bitmap includes a plurality of bits, and each bit corresponds to one 20 MHz channel. For each bit in the bitmap, when a value of a bit is a first value, a 20 MHz channel corresponding to the bit is a subchannel of the recommended first channel. When a value of a bit is a second value, a 20 MHz channel corresponding to the bit is not a subchannel of the recommended first channel. For example, the first value is 1, and the second value is 0. Alternatively, the first value is 0, and the second value is 1. It should be understood that, when the bitmap includes a bit corresponding to the primary 20 MHz channel, the bit corresponding to the primary 20 MHz channel is set to the second value by default.

S502: The second device sends first response information to the first device. Correspondingly, the first device receives the first response information sent by the second device.

The first response information is used to respond to the first request information. The first response information may be carried in an association response frame, or a control type in an A-Control, or a response frame of an independent frame type.

In this embodiment of this application, the first response information is used to determine the first channel.

In a possible implementation, if the first indication information does not indicate the recommended first channel, the first response information is further used to configure the first channel.

In another possible implementation, if the first indication information further indicates the recommended first channel, the first response information is further used to agree to use the recommended first channel, or the first response information is further used to configure the first channel.

It should be understood that if the first response information is used to agree to use the recommended first channel, the recommended first channel is the actually used first channel.

Optionally, the first response information is further used to configure the first channel, and any one of the following implementations may be used:

Implementation 1: The first response information includes an index of the first channel. Alternatively, the first response information includes an index of each subchannel of the first channel.

Implementation 2: The first response information includes a bitmap, where the bitmap includes a plurality of bits, and each bit corresponds to one 20 MHz channel. For each bit in the bitmap, when a value of a bit is a first value, a 20 MHz channel corresponding to the bit is a subchannel of the first channel. When a value of a bit is a second value, a 20 MHz channel corresponding to the bit is not a subchannel of the first channel. For example, the first value is 1, and the second value is 0. Alternatively, the first value is 0, and the second value is 1. It should be understood that, when the bitmap includes a bit corresponding to the primary 20 MHz channel, the bit corresponding to the primary 20 MHz channel is set to the second value by default.

It should be understood that both the first device and the second device determine the first channel based on the first response information.

Based on the embodiment shown in FIG. 9(a), the first device and the second device can determine a same first channel based on an interaction process of the first request information and the first response information.

Figures 9B, 10A:
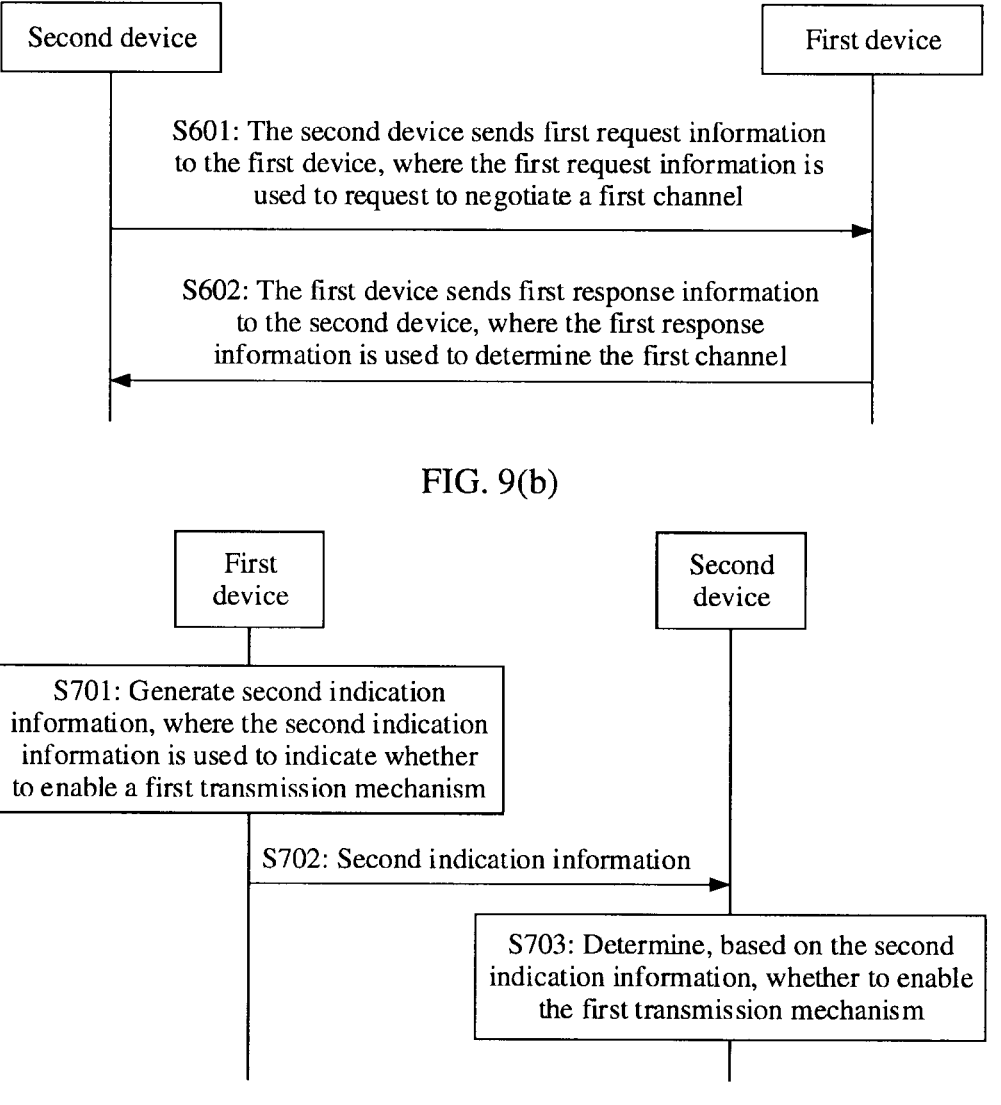
FIG. 10(*a*) is an example flowchart of another data transmission method according to an embodiment of this application.

In another possible example, FIG. 9(b) shows another data transmission method according to an embodiment of this application. The method includes the following steps.

S601: The second device sends first request information to the first device. Correspondingly, the first device receives the first request information sent by the second device.

S602: The first device sends first response information to the second device. Correspondingly, the second device receives the first response information sent by the first device.

For specific descriptions of the first request information and the first response information, refer to the foregoing description.

Based on the embodiment shown in FIG. 9(b), the first device and the second device can determine a same first channel based on an interaction process of the first request information and the first response information.

For ease of description, a transmission mechanism described in the embodiments shown in FIG. 6(a) and FIG. 7(a) is defined as a first transmission mechanism in this embodiment of this application. Specifically, the first transmission mechanism is used by the first device and the second device to switch from the primary 20 MHz channel to the first channel when the first preset condition is met.

In a possible implementation, the first transmission mechanism may be enabled by default between the first device and the second device.

In another possible implementation, the first device and the second device may negotiate whether to enable the first transmission mechanism, so that flexibility can be improved, and the first transmission mechanism can be used in different application scenarios.

For example, when a problem of a hidden node is serious because a distance between the first device and the second device is long, even if the first transmission mechanism is enabled between the first device and the second device, there is a high probability that the first device and the second device cannot simultaneously switch to the first channel, and therefore cannot perform normal communication on the first channel. Therefore, in this scenario, the first device and the second device may negotiate to disable the first transmission mechanism, to simplify related operations of the first device and the second device.

It should be understood that after the first transmission mechanism is disabled, the first device does not perform the embodiment shown in FIG. 6(a), and the second device does not perform the embodiment shown in FIG. 7(a). After the first transmission mechanism is enabled, the first device may perform the embodiment shown in FIG. 6(a), and the second device may perform the embodiment shown in FIG. 7(a).

With reference to an embodiment, the following describes a specific implementation in which the first device and the second device negotiate whether to enable the first transmission mechanism.

In a possible example, FIG. 10(a) shows a data transmission method according to an embodiment of this application. The method includes the following steps.

S701: The first device generates second indication information.

The second indication information indicates whether to enable the first transmission mechanism. Alternatively, the second indication information indicates whether to disable the first transmission mechanism.

Optionally, the second indication information may be carried in a management frame, a control frame, or an A-control field.

In a possible implementation, the second indication information is information specially sent to the second device.

In another possible implementation, the second indication information is information broadcast to another device associated with the first device. It should be understood that another device associated with the first device includes the second device.

S702: The first device sends the second indication information to the second device. Correspondingly, the second device receives the second indication information sent by the first device.

S703: The second device determines, based on the second indication information, whether to enable the first transmission mechanism.

It should be understood that, when the second indication information indicates to enable the first transmission mechanism, the second device determines to enable the first transmission mechanism. Alternatively, when the second indication information indicates to disable the first transmission mechanism, the second device determines to disable the first transmission mechanism.

Based on the embodiment shown in FIG. 10(a), the first device sends the second indication information to the second device, to determine whether to enable the first transmission mechanism between the first device and the second device.

Figures 10B, 11A:
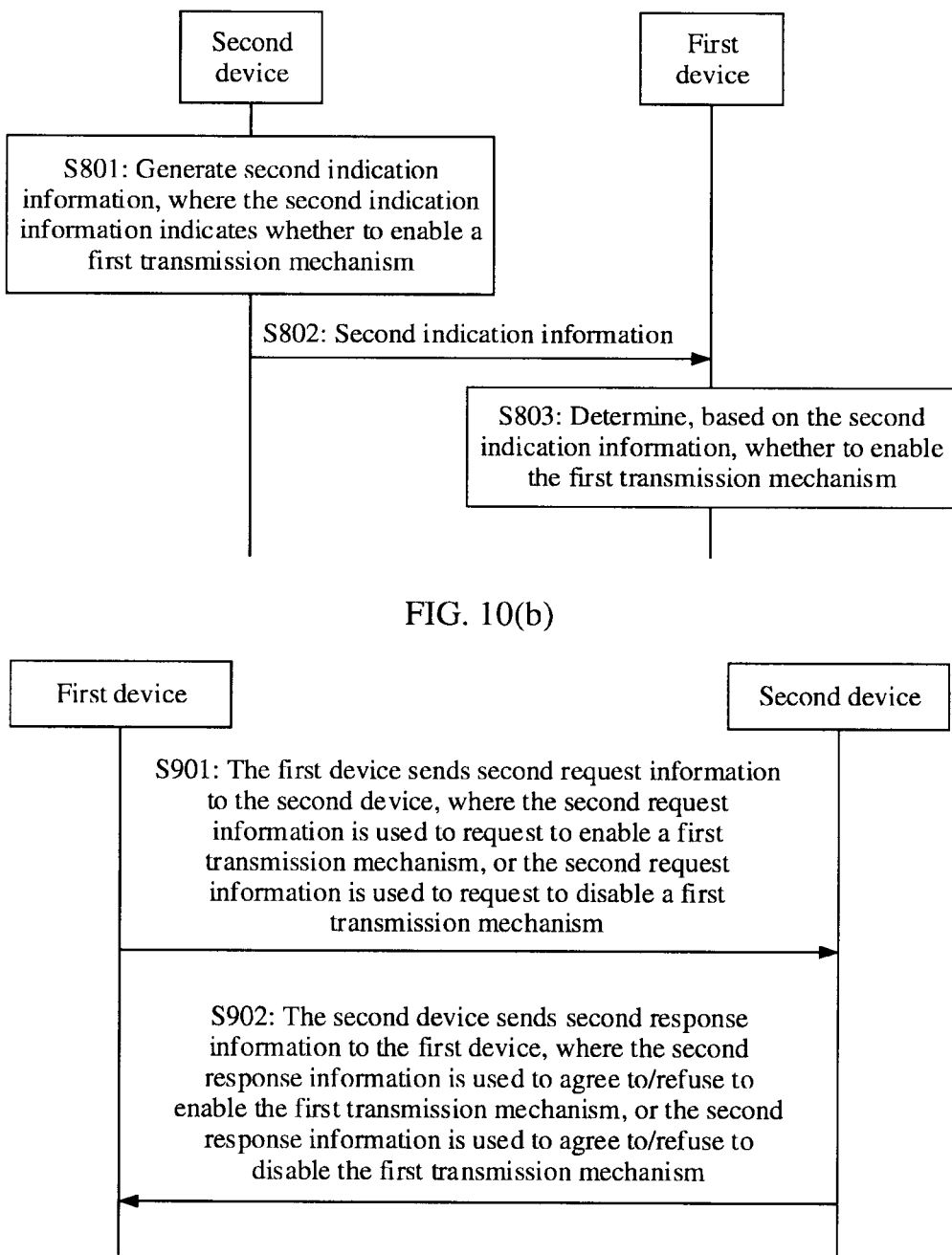
FIG. 11(*a*) is an example flowchart of another data transmission method according to an embodiment of this application.

In another possible example, FIG. 10(b) shows another data transmission method according to an embodiment of this application. The method includes the following steps.

S801: The second device generates second indication information.

The second indication information indicates whether to enable the first transmission mechanism. Alternatively, the second indication information indicates whether to disable the first transmission mechanism.

Optionally, the second indication information may be carried in a management frame, a control frame, or an A-control field.

In a possible implementation, the second indication information is information specially sent to the first device.

In another possible implementation, the second indication information is information broadcast to another device associated with the second device. It should be understood that another device associated with the second device includes the first device.

S802: The second device sends the second indication information to the first device. Correspondingly, the first device receives the second indication information sent by the second device.

S803: The first device determines, based on the second indication information, whether to enable the first transmission mechanism.

It should be understood that, when the second indication information indicates to enable the first transmission mechanism, the first device determines to enable the first transmission mechanism. Alternatively, when the second indication information indicates to disable the first transmission mechanism, the first device determines to disable the first transmission mechanism.

Based on the embodiment shown in FIG. 10(b), the second device sends the second indication information to the first device, to determine whether to enable the first transmission mechanism between the first device and the second device.

In another possible example, FIG. 11(a) shows a data transmission method according to an embodiment of this application. The method includes the following steps.

S901: The first device sends second request information to the second device. Correspondingly, the second device receives the second request information sent by the first device.

The second request information is used to request to enable the first transmission mechanism. Alternatively, the second request information is used to request to disable the first transmission mechanism.

Optionally, the second request information may be carried in a management frame, a control frame, or an A-control field.

S902: The second device sends second response information to the first device. Correspondingly, the first device receives the second response information sent by the second device.

In this embodiment of this application, the second response information is used to respond to the second request information. Optionally, the second response information may be carried in a management frame, a control frame, or an A-control field.

Optionally, when the second request information is used to request to enable the first transmission mechanism, the second response information is used to agree to or refuse to enable the first transmission mechanism.

It should be understood that, when the second response information is used to agree to enable the first transmission mechanism, the first transmission mechanism is enabled between the first device and the second device. Alternatively, when the second response information is used to refuse to enable the first transmission mechanism, the first transmission mechanism is disabled between the first device and the second device.

Optionally, when the second request information is used to request to disable the first transmission mechanism, the second response information is used to agree to or refuse to disable the first transmission mechanism.

It should be understood that, when the second response information is used to agree to disable the first transmission mechanism, the first transmission mechanism is disabled between the first device and the second device. Alternatively, when the second response information is used to refuse to disable the first transmission mechanism, the first transmission mechanism is enabled between the first device and the second device.

Based on the embodiment shown in FIG. 11(a), the second device and the first device determine, based on interaction between the second request information and the second response information, whether to enable the first transmission mechanism.

Figures 11B, 12A:
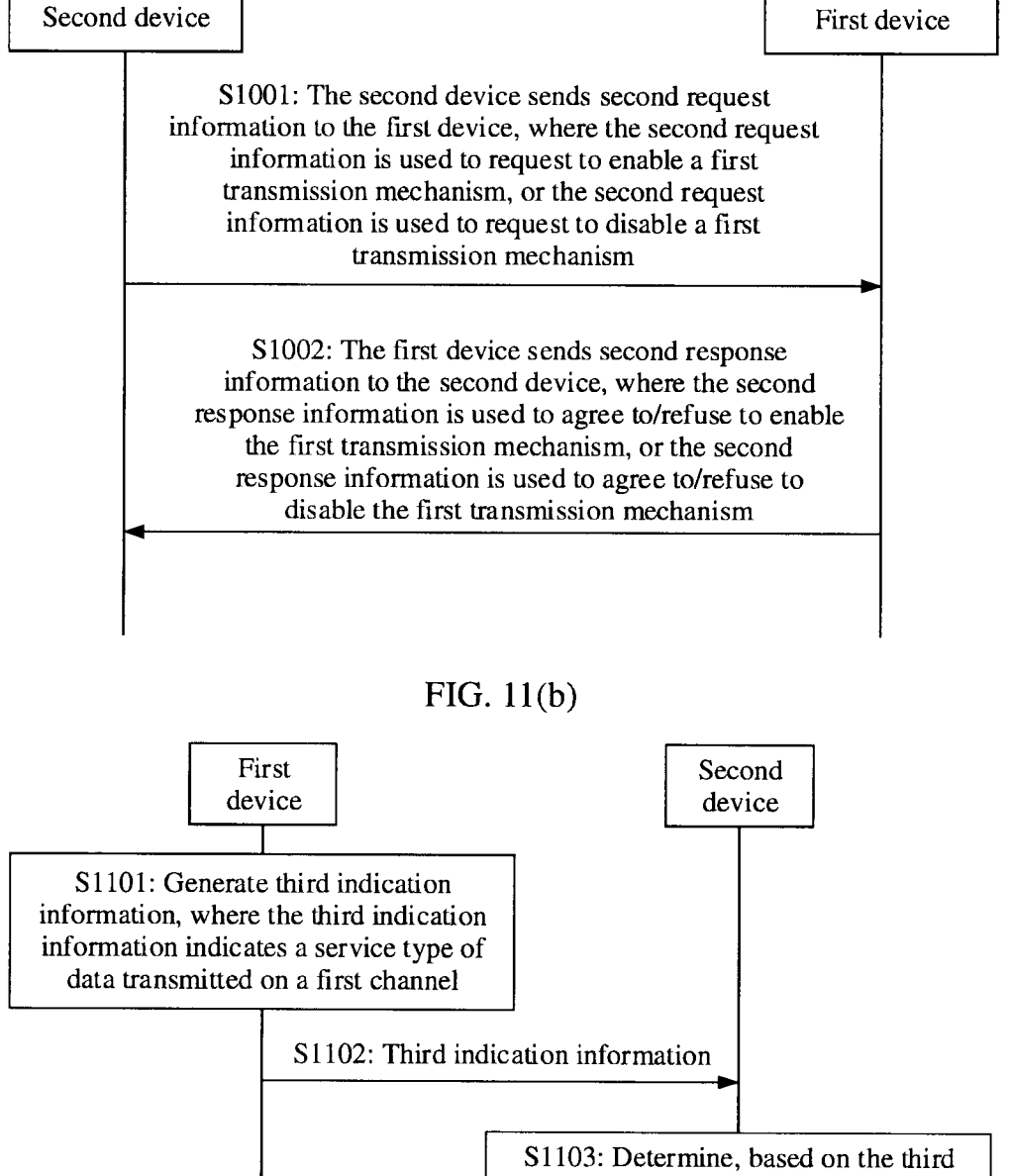
FIG. 12(*a*) is an example flowchart of another data transmission method according to an embodiment of this application.

In another possible example, FIG. 11(b) shows another data transmission method according to an embodiment of this application. The method includes the following steps.

S1001: The second device sends second request information to the first device. Correspondingly, the first device receives the second request information sent by the second device.

S1002: The first device sends second response information to the second device. Correspondingly, the second device receives the second response information sent by the first device.

For specific descriptions of the second request information and the second response information, refer to the foregoing description.

Based on the embodiment shown in FIG. 11(b), the second device and the first device determine, based on interaction between the second request information and the second response information, whether to enable the first transmission mechanism.

The following describes a specific implementation in which the first device and the second device negotiate to determine a service type of data transmitted on the first channel. It should be understood that the following embodiments shown in FIG. 12(a), FIG. 12(b), FIG. 13(a), or FIG. 13(b) may be used in combination with the embodiments shown in FIG. 6(a), FIG. 6(b), FIG. 6(c), FIG. 7(a), FIG. 7(b), and FIG. 7(c).

In a possible example, FIG. 12(a) shows a data transmission method according to an embodiment of this application. The method includes the following steps.

S1101: The first device generates third indication information.

The third indication information indicates a service type of data transmitted on the first channel.

For example, the third indication information may include one or more identifiers of the service type. Therefore, the identifier of the service type included in the third indication information is used to determine a service type of data that is allowed to be transmitted on the first channel.

Optionally, the identifier of the service type may be an access category (AC) or a service identifier (traffic identifier, TID).

For example, a type of the AC may be shown in Table 1.

TABLE 1

| ACI | AC | Description |
| --- | --- | --- |
| 0 | AC_BE | Best effort service (best effort) |
| 1 | AC_BK | Background service (background) |
| 2 | AC_VI | Video service (video) |
| 3 | AC_VO | Voice service (voice) |

For example, the third indication information may indicate that data corresponding to AC_VO and/or AC_VI is transmitted on the first channel.

In this embodiment of this application, the third indication information may be carried in a management frame, a control frame, or an A-control field.

S1102: The first device sends the third indication information to the second device. Correspondingly, the second device receives the third indication information sent by the first device.

S1103: The second device determines, based on the third indication information, the service type of the data transmitted on the first channel.

Based on the embodiment shown in FIG. 12(a), the second device may determine, based on the third indication information sent by the first device, service types of data that is allowed to be transmitted on the first channel, to reduce a transmission delay of data of these service types.

Figures 12B, 13A:
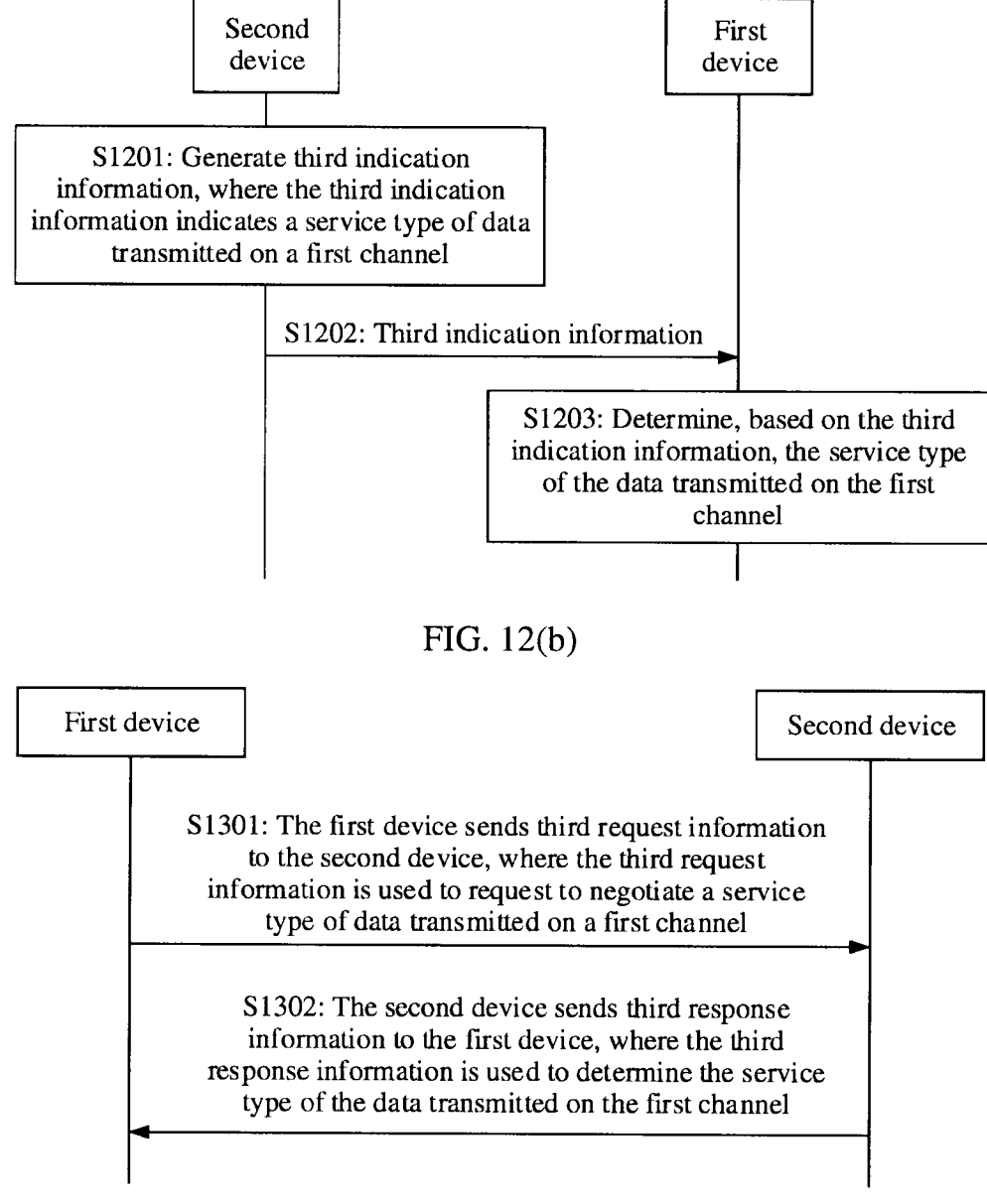
FIG. 13(*a*) is an example flowchart of another data transmission method according to an embodiment of this application.

In another possible example, FIG. 12(b) shows another data transmission method according to an embodiment of this application. The method includes the following steps.

S1201: The second device generates third indication information.

S1202: The second device sends the third indication information to the first device. Correspondingly, the first device receives the third indication information sent by the second device.

S1203: The first device determines, based on the third indication information, a service type of data transmitted on the first channel.

For a specific description of the third indication information, refer to the foregoing description.

Based on the embodiment shown in FIG. 12(*b*), the first device may determine, based on the third indication information sent by the first device, service types of data that is allowed to be transmitted on the first channel, to reduce a transmission delay of data of these service types.

In another possible example, FIG. 13(*a*) shows a data transmission method according to an embodiment of this application. The method includes the following steps.

S1301: The first device sends third request information to the second device. Correspondingly, the second device receives the third request information sent by the first device.

The third request information is used to request to negotiate a service type of data transmitted on the first channel.

In a possible implementation, the third request information includes identifiers of one or more recommended service types.

In another possible implementation, the third request information does not include identifiers of one or more recommended service types.

In this embodiment of this application, the third request information is carried in a management frame, a control frame, or an A-control field.

S1302: The second device sends third response information to the first device. Correspondingly, the first device receives the third response information sent by the second device.

The third response information is used to respond to the third request information. The third response information is used to determine the service type of the data transmitted on the first channel.

In a possible implementation, when the third request information does not include identifiers of one or more recommended service types, the third response information includes identifiers of one or more recommended service types of data transmitted on the first channel.

In another possible implementation, when the third request information includes identifiers of one or more recommended service types, the third response information indicates that data of the one or more recommended service types is allowed to be transmitted on the first channel, or the third response information includes identifiers of one or more service types of the data transmitted on the first channel.

It should be understood that the first device and the second device determine, based on the third response information, the service type of the data transmitted on the first channel.

Based on the embodiment shown in FIG. 13(*a*), the first device and the second device may determine, based on interaction between the third request information and the third response information, service types of data that is allowed to be transmitted on the first channel, to reduce a transmission delay of data of these service types.

In another possible example, FIG. 13(*b*) shows another data transmission method according to an embodiment of this application. The method includes the following steps.

S1401: The second device sends third request information to the first device. Correspondingly, the first device receives the third request information sent by the second device.

S1402: The first device sends third response information to the second device. Correspondingly, the second device receives the third response information sent by the first device.

For specific descriptions of the third request information and the third response information description, refer to the foregoing description.

Based on the embodiment shown in FIG. 13(*b*), the first device and the second device may determine, based on interaction between the third request information and the third response information, service types of data that is allowed to be transmitted on the first channel, to reduce a transmission delay of data of these service types.

The foregoing mainly describes the solutions provided in embodiments of this application from a perspective of a communication apparatus (for example, the first device or the second device). It may be understood that, to implement the foregoing functions, the communication apparatus includes a corresponding hardware structure and/or software module for performing each function. A person skilled in the art should be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and implementation constraints of the technical solutions. A person skilled in the art may use different methods to implement the described functions for each particular application, but it should not be considered that the implementation goes beyond the scope of this application.

In embodiments of this application, the apparatus may be divided into functional modules based on the foregoing method examples. For example, each functional module may be obtained through division based on each corresponding function, or two or more functions may be integrated into one functional module. The integrated module may be implemented in a form of hardware, or may be implemented in a form of a software functional module. In this embodiment of this application, module division is an example, and is merely a logical function division. In actual implementation, another division manner may be used. An example in which each function module is obtained through division based on each corresponding function is used below for description.

FIG. 14 shows a communication apparatus according to an embodiment of this application. The communication apparatus includes a backoff module 101, a switching module 102, and a communication module 103.

In a possible implementation, when the communication apparatus serves as the first device, the backoff module 101 is configured to perform step S101 in FIG. 6(*a*) and step S103 in FIG. 6(*b*). The switching module 102 is configured to perform step S102 in FIG. 6(*a*) and step S105 in FIG. 6(*c*). The communication module 103 is configured to perform step S104 in FIG. 6(*b*), step S302 in FIG. 8(*a*), step S402 in FIG. 8(*b*), steps S501 and S502 in FIG. 9(*a*), steps S601 and S602 in FIG. 9(*b*), step S702 in FIG. 10(*a*), step S802 in FIG. 10(*b*), steps S901 and S902 in FIG. 11(*a*), steps S1001 and S1002 in FIG. 11(*b*), step S1102 in FIG. 12(*a*), step S1202 in FIG. 12(*b*), steps S1301 and S1302 in FIG. 13(*a*), and steps S1401 and S1402 in FIG. 13(*b*).

In a possible implementation, when the communication apparatus serves as the second device, the backoff module 101 is configured to perform step S201 in FIG. 7(*a*) and step S203 in FIG. 7(*b*). The switching module 102 is configured to perform step S202 in FIG. 7(*a*) and step S205 in FIG. 7(*c*). The communication module 103 is configured to perform step S204 in FIG. 7(*b*), step S302 in FIG. 8(*a*), step S402 in FIG. 8(*b*), steps S501 and S502 in FIG. 9(*a*), steps S601 and S602 in FIG. 9(*b*), step S702 in FIG. 10(*a*), step S802 in FIG. 10(*b*), steps S901 and S902 in FIG. 11(*a*), steps S1001 and S1002 in FIG. 11(*b*), step S1102 in FIG. 12(*a*), step S1202 in FIG. 12(*b*), steps S1301 and S1302 in FIG. 13(*a*), and steps S1401 and S1402 in FIG. 13(*b*).

It should be understood that the backoff module 101 and the switching module 102 may be integrated into a processing module.

Figure 15:
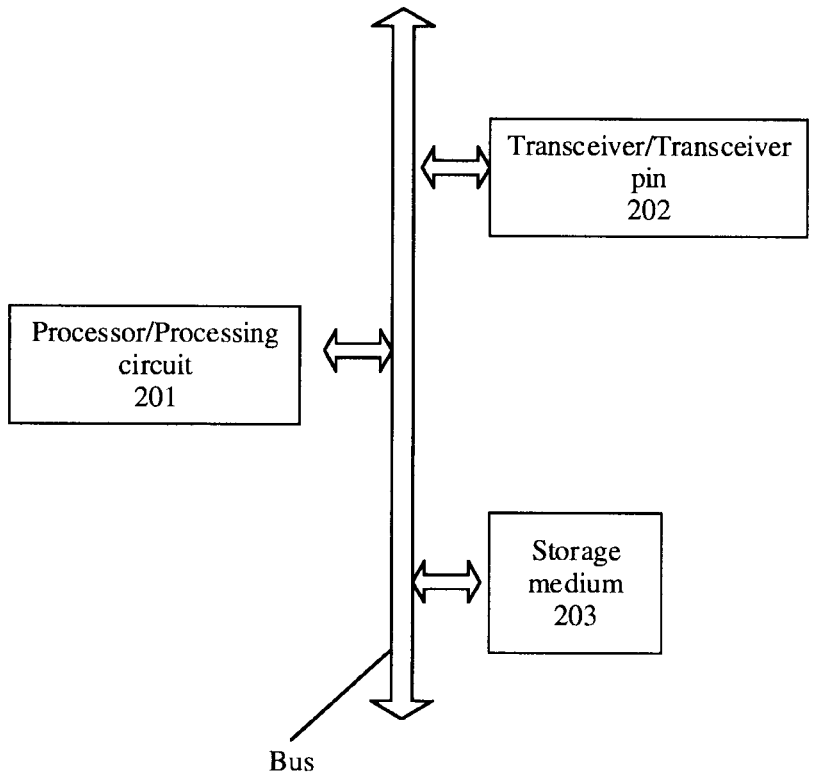
FIG. 15 is an example schematic diagram of a hardware structure of a communication apparatus according to an embodiment of this application.

FIG. 15 is a diagram of a structure of a possible product form of a communication apparatus according to an embodiment of this application.

In a possible product form, the communication apparatus in this embodiment of this application may be the foregoing first device, and the first device includes a processor 201 and a transceiver 202. Optionally, the communication device further includes a storage medium 203.

The processor 201 is configured to perform step S101 in FIG. 6(*a*), step S103 in FIG. 6(*b*), step S102 in FIG. 6(*a*), and step S105 in FIG. 6(*c*). The transceiver 202 is configured to perform step S104 in FIG. 6(*b*), step S302 in FIG. 8(*a*), step S402 in FIG. 8(*b*), steps S501 and S502 in FIG. 9(*a*), steps S601 and S602 in FIG. 9(*b*), step S702 in FIG. 10(*a*), step S802 in FIG. 10(*b*), steps S901 and S902 in FIG. 11(*a*), steps S1001 and S1002 in FIG. 11(*b*), step S1102 in FIG. 12(*a*), step S1202 in FIG. 12(*b*), steps S1301 and S1302 in FIG. 13(*a*), and steps S1401 and S1402 in FIG. 13(*b*).

In another possible product form, the communication apparatus in this embodiment of this application may be the foregoing second device, and the second device includes a processor 201 and a transceiver 202. Optionally, the communication device further includes a storage medium 203.

The processor 201 is configured to perform step S201 in FIG. 7(*a*), step S203 in FIG. 7(*b*), step S202 in FIG. 7(*a*), and step S205 in FIG. 7(*c*). The transceiver 202 is configured to perform step S204 in FIG. 7(*b*), step S302 in FIG. 8(*a*), step S402 in FIG. 8(*b*), steps S501 and S502 in FIG. 9(*a*), steps S601 and S602 in FIG. 9(*b*), step S702 in FIG. 10(*a*), step S802 in FIG. 10(*b*), steps S901 and S902 in FIG. 11(*a*), steps S1001 and S1002 in FIG. 11(*b*), step S1102 in FIG. 12(*a*), step S1202 in FIG. 12(*b*), steps S1301 and S1302 in FIG. 13(*a*), and steps S1401 and S1402 in FIG. 13(*b*).

In another possible product form, the communication apparatus in this embodiment of this application may be implemented by using a chip. The chip includes a processing circuit 201 and a transceiver pin 202. Optionally, the chip may further include a storage medium 203.

In another possible product form, the communication apparatus in this embodiment of this application may alternatively be implemented by using the following circuit or component: one or more field programmable gate arrays (FPGA), a programmable logic device (PLD), a controller, a state machine, gate logic, a discrete hardware component, any other suitable circuits, or any combination of circuits that can perform various functions described in this application.

Optionally, an embodiment of this application further provides a computer-readable storage medium. The computer-readable storage medium stores computer instructions. When the computer instructions are run on a computer, the computer is enabled to perform the communication method in the foregoing method embodiments.

Optionally, an embodiment of this application further provides a computer program product including computer instructions. When the computer instructions are run on a computer, the computer is enabled to perform the communication method in the foregoing method embodiments.

It should be understood that the computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium, a semiconductor medium (for example, a solid-state drive), or the like.

Based on the foregoing descriptions of the implementations, a person skilled in the art may understand that for the purpose of convenient and brief descriptions, division into the foregoing functional modules is merely used as an example for description. During actual application, the foregoing functions can be allocated to different functional modules for implementation based on a requirement, that is, an inner structure of an apparatus is divided into different functional modules to implement all or some of the functions described above.

It should be understood that the apparatus and method disclosed in the several embodiments provided in this application may be implemented in other manners. For example, the described apparatus embodiment is merely an example. For example, division into the modules or the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected according to actual requirements to achieve the objectives of the solutions of the embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software function unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of steps of the methods described in embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data transmission method, comprising:

performing, by a first device, data transmission with a second device by performing backoff on a primary 20 megahertz (MHz) channel; and in association with a first preset condition being satisfied, switching, by the first device, from the primary 20 MHz channel to a first channel preconfigured for communication between the first device and the second device, wherein the first channel does not include the primary 20 MHz channel, the first preset condition includes, at least, the primary 20 MHz channel being in a busy state, the first preset condition further includes a target duration is greater than or equal to a first preset duration, the target duration includes a remaining transmission duration of the first OBSS frame received by the first device on the primary 20 MHz channel, or the target duration includes the remaining timing duration of a first network allocation vector (NAV) on the primary 20 MHz channel, and the primary 20 MHz channel being in the busy state comprises at least one of:

the first device receives a first overlapped basic service set (OBSS) frame on the primary 20 MHz channel, the first device determines that an energy detection result on the primary 20 MHz channel includes a busy state, or the first device determines that a value of the first NAV on the primary 20 MHz channel is greater than 0.

2. The method according to claim 1, further comprising:

performing, by the first device, backoff on the first channel; and after the first channel backs off to 0, performing, by the first device, data transmission with the second device on the first channel.

3. The method according to claim 2, wherein in association with the first channel including a plurality of subchannels, performing, by the first device, backoff on the first channel comprises:

performing, by the first device, backoff on each of the plurality of subchannels.

4. The method according to claim 3, further comprising:

in association with the first device synchronizing to a physical frame header on any subchannel of the plurality of subchannels, suspending, by the first device, backoff on all subchannels of the plurality of subchannels, and determining whether a physical frame corresponding to the physical frame header is an OBSS frame; and (a) in association with the physical frame corresponding to the physical frame header being the OBSS frame, continuing, by the first device, to perform backoff on each subchannel of the plurality of subchannels;

(b) in association with the physical frame corresponding to the physical frame header not being the OBSS frame, continuing, by the first device, to suspend backoff on all subchannels of the plurality of subchannels until transmission of the physical frame corresponding to the physical frame header is completed; or (c) in association with the physical frame corresponding to the physical frame header not being the OBSS frame, continuing, by the first device, to suspend backoff on all subchannels of the plurality of subchannels until an NAV configured for the physical frame corresponding to the physical frame header is reduced to 0.

5. The method according to claim 3, further comprising:

receiving, by the first device, a physical frame on any subchannel of the plurality of subchannels; and (a) in association with the first device determining that the physical frame is from a BSS to which the first device belongs, suspending, by the first device, backoff on all subchannels of the plurality of subchannels until transmission of the physical frame is completed; or (b) in association with the first device determining that the physical frame is from the BSS to which the first device belongs, suspending, by the first device, backoff on all subchannels of the plurality of subchannels until an NAV configured for the physical frame is reduced to 0.

6. The method according to claim 1, wherein the first channel is a secondary 20 MHz channel, the first channel is a 20 MHz channel with a lowest frequency in an 80 MHz channel, or the first channel is a 20 MHz channel with a highest frequency in an 80 MHz channel.

7. A communication apparatus applied for a first device, the communication apparatus comprising:

at least one processor; and at least one memory coupled to the at least one processor, the at least one memory storing instructions for execution by the at least one processor to cause the communication apparatus to:

perform data transmission with a second device by performing backoff on a primary 20 megahertz (MHz) channel; and when a first preset condition is satisfied, switch from the primary 20 MHz channel to a first channel preconfigured for communication between the communication apparatus and the second device, wherein the first channel does not include the primary 20 MHz channel, the first preset condition includes, at least, the primary 20 MHz channel being in a busy state, the first preset condition further includes a target duration is greater than or equal to a first preset duration, the target duration includes a remaining transmission duration of the first OBSS frame received by the first device on the primary 20 MHz channel, or the target duration includes the remaining timing duration of a first network allocation vector (NAV) on the primary 20 MHz channel, and the primary 20 MHz channel being in the busy state comprises at least one of:

the first device receives a first overlapped basic service set (OBSS) frame on the primary 20 MHz channel, the first device determines that an energy detection result on the primary 20 MHz channel includes a busy state, or the first device determines that a value of the first NAV on the primary 20 MHz channel is greater than 0.

8. The communication apparatus according to claim 7, wherein the communication apparatus is further caused to:

perform backoff on the first channel; and after the first channel backs off to 0, perform data transmission with the second device on the first channel.

9. The communication apparatus according to claim 8, wherein when the first channel includes a plurality of subchannels, performing backoff on the first channel comprises:

performing backoff on each of the plurality of subchannels.

10. The communication apparatus according to claim 9, wherein the communications apparatus is further caused to:

if the communication apparatus synchronizes to a physical frame header on any subchannel of the plurality of subchannels, suspend backoff on all subchannels of the plurality of subchannels, and determine whether a physical frame corresponding to the physical frame header is an OBSS frame; and (a) if the physical frame corresponding to the physical frame header is the OBSS frame, continue to perform backoff on each subchannel of the plurality of subchannels;

(b) if the physical frame corresponding to the physical frame header is not the OBSS frame, continue to suspend backoff on all subchannels of the plurality of subchannels until transmission of the physical frame corresponding to the physical frame header is completed; or (c) if the physical frame corresponding to the physical frame header is not the OBSS frame, continue to suspend backoff on all subchannels of the plurality of subchannels until an NAV configured for the physical frame corresponding to the physical frame header is reduced to 0.

11. The communication apparatus according to claim 9, wherein the communication apparatus is further caused to:

receive a physical frame on any subchannel of the plurality of subchannels; and (a) if the communication apparatus determines that the physical frame is from a BSS to which the communication apparatus belongs, suspend backoff on all subchannels of the plurality of subchannels until transmission of the physical frame is completed; or (b) if the communication apparatus determines that the physical frame is from the BSS to which the communication apparatus belongs, suspend backoff on all subchannels of the plurality of subchannels until an NAV configured for the physical frame is reduced to 0.

12. The communication apparatus according to claim 7, wherein the first channel is a secondary 20 MHz channel, the first channel is a 20 MHz channel with a lowest frequency in an 80 MHz channel, or the first channel is a 20 MHz channel with a highest frequency in an 80 MHz channel.

13. A chip applied for a first device, the chip comprising:

a processing circuit; and a transceiver pin, wherein the processing circuit is configured to:

perform data transmission with a second device by performing backoff on a primary 20 megahertz (MHz) channel; and when a first preset condition is satisfied, switch from the primary 20 MHz channel to a first channel preconfigured for communication between the first device and the second device, wherein the first channel does not include the primary 20 MHz channel, the first preset condition includes, at least, the primary 20 MHz channel being in a busy state, the first preset condition further includes a target duration is greater than or equal to a first preset duration, the target duration includes a remaining transmission duration of the first OBSS frame received by the first device on the primary 20 MHz channel, or the target duration includes the remaining timing duration of a first network allocation vector (NAV) on the primary 20 MHz channel, and the primary 20 MHz channel being in the busy state comprises at least one of:

the first device receives a first overlapped basic service set (OBSS) frame on the primary 20 MHz channel, the first device determines that an energy detection result on the primary 20 MHz channel includes a busy state, or the first device determines that a value of the NAV on the primary 20 MHz channel is greater than 0.

14. The chip according to claim 13, wherein the processing circuit is further configured to:

perform backoff on the first channel; and after the first channel backs off to 0, perform data transmission with the second device on the first channel.

15. The chip according to claim 14, wherein when the first channel includes a plurality of subchannels, performing backoff on the first channel comprises:

performing backoff on each of the plurality of subchannels.

16. The chip according to claim 15, wherein the processing circuit is further configured to:

if the first device synchronizes to a physical frame header on any subchannel of the plurality of subchannels, suspend backoff on all subchannels of the plurality of subchannels, and determine whether a physical frame corresponding to the physical frame header is an OBSS frame; and (a) if the physical frame corresponding to the physical frame header is the OBSS frame, continue to perform backoff on each subchannel of the plurality of subchannels;

(b) if the physical frame corresponding to the physical frame header is not the OBSS frame, continue to suspend backoff on all subchannels of the plurality of subchannels until transmission of the physical frame corresponding to the physical frame header is completed; or (c) if the physical frame corresponding to the physical frame header is not the OBSS frame, continue to suspend backoff on all subchannels of the plurality of subchannels until an NAV configured for the physical frame corresponding to the physical frame header is reduced to 0.

17. The chip according to claim 13, wherein the first channel is a secondary 20 MHz channel, the first channel is a 20 MHz channel with a lowest frequency in an 80 MHz channel, or the first channel is a 20 MHz channel with a highest frequency in an 80 MHz channel.

* * * * *